(12) United States Patent
Uruno et al.

(10) Patent No.: US 7,557,546 B2
(45) Date of Patent: Jul. 7, 2009

(54) UNIDIRECTIONAL DC-DC CONVERTER

(75) Inventors: Junpei Uruno, Tokai (JP); Hiroyuki Shoji, Hitachi (JP); Akihiko Kanouda, Hitachinaka (JP); Yasuo Kaminaga, Hitachi (JP)

(73) Assignees: Hitachi, Ltd., Tokyo (JP); Hitachi Appliances, Inc., Tokyo (JP)

( * ) Notice: Subject to any disclaimer, the term of this patent is extended or adjusted under 35 U.S.C. 154(b) by 0 days.

(21) Appl. No.: 11/627,393

(22) Filed: Jan. 26, 2007

(65) Prior Publication Data

US 2007/0236966 A1 Oct. 11, 2007

(30) Foreign Application Priority Data

Apr. 6, 2006 (JP) ............... 2006-105256

(51) Int. Cl.
*G05F 1/24* (2006.01)
(52) U.S. Cl. .................. 323/259; 323/225; 323/290
(58) Field of Classification Search ............ 363/20, 363/21.02, 89, 95; 323/267, 225, 259, 262, 323/284, 290
See application file for complete search history.

(56) References Cited

U.S. PATENT DOCUMENTS

| 5,066,900 | A  | * | 11/1991 | Bassett ................. 323/224 |
| 6,018,469 | A  | * | 1/2000  | Poon .................... 363/20 |
| 6,600,670 | B2 | * | 7/2003  | Morita et al. ............ 363/89 |
| 6,639,813 | B2 | * | 10/2003 | Yamagishi et al. ....... 363/21.12 |
| 6,671,188 | B2 | * | 12/2003 | Morita ................. 363/21.01 |
| 6,680,854 | B2 | * | 1/2004  | Morita et al. ............ 363/25 |
| 6,690,586 | B2 | * | 2/2004  | Hosotani et al. .......... 363/19 |
| 6,710,582 | B2 | * | 3/2004  | Watanabe ............... 323/222 |
| 2006/0176719 | A1 | * | 8/2006 | Uruno et al. ............. 363/89 |

FOREIGN PATENT DOCUMENTS

| JP | 2004-129393 | 4/2004 |
| JP | 2005-318766 | 11/2005 |

OTHER PUBLICATIONS

"Proposal pf 98.5% High Efficiency Chopper Circuit QRAS for the Electric vehicle and Verification" Yukinori Tsuruta, Atsuo Kawamura, ieej Trans. IA, vol. 125, No. 11, 2005.

* cited by examiner

*Primary Examiner*—Jessica Han
*Assistant Examiner*—Emily Pham
(74) *Attorney, Agent, or Firm*—Antonelli, Terry, Stout & Kraus, LLP.

(57) ABSTRACT

A unidirectional DC-DC converter which has a simple control circuit without using multiple insulated power supplies or a transformer, uses an auxiliary inductor of a comparatively small capacitance, reduces the size and weight of the converter, and has a very great capacitance without switching of supply current. For example, a unidirectional DC-DC converter equipped with main IGBT101 which supplies and shuts off current for first inductor 108a and diode 107 which discharges energy from main inductor 108a to an output. The DC-DC converter is further equipped with auxiliary IGBT104 which applies current to back-to-back-connected diode 102 by using energy stored in auxiliary inductor 108b which is magnetically coupled with main inductor 108a. This applies current to the back-to-back-connected diode in a short period including a time period in which the first switching element is turned on and accomplishes ZVZCS.

3 Claims, 17 Drawing Sheets k=0.2~0.9 k<0.2

UNIDIRECTIONAL DC-DC CONVERTER

CLAIM OF PRIORITY

The present application claims priority from Japanese application serial No. 2006-105256, filed on Apr. 6, 2006, the content of which is hereby incorporated by reference into this application.

FIELD OF THE INVENTION

This invention relates to a unidirectional DC-DC converter which converts a supplied voltage into the other voltage.

BACKGROUND OF THE INVENTION

A unidirectional DC-DC converter which converts a supplied voltage into a desired voltage can increase the conversion efficiency by reducing switching losses by soft switching technology. Simultaneously, it is possible to downsize inductors, capacitors, and other passive elements by increasing driving frequencies of switching elements.

Japanese Patent Laid-open No. 2005-318766 (Patent Document 1) discloses a unidirectional DC-DC converter which can perform soft switching. In the main circuit of the DC-DC converter, main switching element is directly connected to a DC power supply. An inductor and a load are connected in series thereto. An auxiliary resonance circuit including an auxiliary switching element is connected to a series circuit of the DC power supply and the main switching element.

Further, Turuta et al, "Proposal and experiments of 98.5% High Efficiency Chopper Circuit QRAS for electric vehicles" Institute of Electrical Engineers Article D 2005, Vol. 125 No. 11 (Non-Patent Document 1) discloses a unidirectional DC-DC converter of a zero-current switching (ZCS) type which suppresses the rate-of-change of current of the main switching element.

Japanese Patent Laid-open No. 2004-129393 (Patent Document 2), for example, discloses a circuit configuration of a bidirectional DC-DC converter which can perform soft-switching.

SUMMARY OF THE INVENTION

In the circuit of Patent Document 1, however, since main and auxiliary switching elements have different reference potentials, two sets of insulated power supplies are required to control the switching elements. This makes the DC-DC converter complicated and expensive. Moreover, current flowing through the resonance inductor is very big and must be greater than ½ of current which flows through the main inductor. This increases the size and weight of the DC-DC converter. Further, since the main switching element is directly connected in series to the DC power supply, the power supply must perform switching and this is not effective in increasing the capacity.

An object of this invention is to provide a unidirectional DC-DC converter which has a simple control circuit which does not use multiple insulated power supplies.

Another object of this invention is to provide a unidirectional DC-DC converter which uses an auxiliary inductor of a comparatively small capacitance and can reduce the size and weight of the converter.

Still another object of this invention is to provide a unidirectional DC-DC converter which can have a very great capacitance without switching of supply current.

In one aspect, this invention relates to a unidirectional DC-DC converter comprising a first switching element which supplies and shuts current from a DC power supply to a first inductor, a diode which is back-to-back connected to the first switching element, a snubber capacitor which is connected in parallel to the first switching element, a control unit which turns on and off the first switching element and controls the duty of the switching element, a circuit means which applies current to the back-to-back-connected diode in a short period including a time period in which the first switching element is turned on, and a diode which discharges energy stored in the inductor to the output side, wherein the circuit means is equipped with a second inductor which is magnetically coupled with the first inductor and a second switching element which supplies current to the back-to-back-connected diode.

A unidirectional DC-DC converter which is a preferred embodiment of this invention is equipped with a series connection of the first switching element and the first inductor which is connected to the DC power supply, a series connection of the second switching element and a second inductor which is connected across the first switching element, a smoothing circuit which smoothes a voltage across the first switching element and takes out an output voltage, and a means which turns on the second switching element just before the first switching element is turned on.

A unidirectional DC-DC converter which is another preferred embodiment of this invention is equipped with a series connection of the first switching element and the first inductor which is connected to the DC power supply, a series connection of the second switching element and a second inductor which is connected to both ends of the first switching element, a smoothing circuit which smoothes a voltage across the first inductor and takes out an output voltage, and a means which turns on the second switching element just before the first switching element is turned on.

In another aspect, this invention relates to a unidirectional DC-DC converter comprising a first switching element which supplies and shuts current from a DC power supply to a first inductor, a diode which is back-to-back connected to the first switching element, a snubber capacitor which is connected in parallel to the first switching element, a control unit which turns on and off the first switching element and controls the duty of the switching element, a circuit means which applies current to the back-to-back-connected diode in a short period including a time period in which the first switching element is turned on, and a diode which discharges energy stored in the inductor to the output side, wherein the circuit means is equipped with a second inductor which is provided in a current path which transfers current from the DC power supply to the first inductor and the first switching element and a second switching element which supplies current to the back-to-back-connected diode.

A unidirectional DC-DC converter which is a preferred embodiment of this invention is equipped with a series connection of the first and second inductors and the first switching element which is connected to the DC power supply, a series connection of the capacitor and the second switching element which is connected across the second inductor, a diode which is back-to-back connected to the second switching element, a snubber capacitor which is connected across the second switching element, a smoothing circuit which smoothes a voltage across the series circuit consisting of the second inductor and the first switching element and takes out an output voltage, and a means which turns on the second switching element just before the first switching element is turned on.

A preferred embodiment of this invention can provide a unidirectional DC-DC converter which has a simple control circuit which does not use multiple insulated power supplies.

Another preferred embodiment of this invention can provide a unidirectional DC-DC converter which uses an auxiliary inductor of a comparatively small capacitance and can reduce the size and weight of the converter.

Still another preferred embodiment of this invention can provide a unidirectional DC-DC converter which can have a very great capacitance without switching of supply current.

The other objects and characteristics of this invention will become more apparent in the detailed description and examples which follow.

DESCRIPTION OF THE PREFERRED EMBODIMENTS

Embodiment 1

The first embodiment of this invention will be explained referring to FIG. 1 and FIG. 2.

Figure 1:
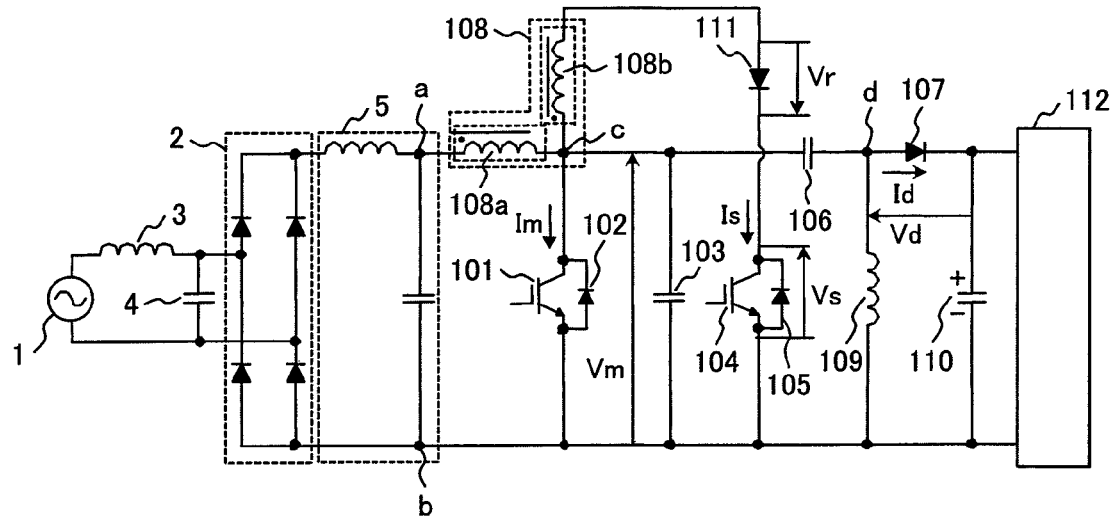
FIG. 1 shows the schematic diagram of the main circuit of the unidirectional DC-DC converter which is the first embodiment of this invention.

FIG. 1 shows the schematic diagram of the main circuit of the unidirectional DC-DC converter which is the first embodiment of this invention. This embodiment is a buck-boost type unidirectional DC-DC converter which enables both a step-up operation which outputs a voltage higher than an input voltage and a step-down operation which outputs a voltage lower than the input voltage.

The main circuit of FIG. 1 is equipped with commercial AC power supply 1, a filter circuit of inductor 3 and capacitor 4, rectification circuit 2, and high-frequency filter 5. AC voltage of commercial AC power supply 1 is filtered by a filter circuit made up of inductor 3 and capacitor 4, full-wave rectified by rectification circuit 2, and filtered into a smooth DC voltage by high-frequency filter 5 which is made up of an inductor and a capacitor.

A series circuit of main (first) inductor 108a and main (first) switching element IGBT101 is connected across the capacitor of high-frequency filter 5 (between ends "a" and "b"). Diode 102 is back-to-back connected to this main switching element IGBT101. Snubber capacitor 103 is connected in parallel to main switching element IGBT101, too. To take up an output voltage, a series circuit of capacitor 106 and inductor 109 is connected across main switching element IGBT101 (between ends "c" and "d"). A series of diode 107 and capacitor 110 are connected across inductor 109 (between ends "d" and "b"). Both ends of capacitor 110 are the output terminals of the unidirectional DC-DC converter. Load 112 is connected across capacitor 110.

The above description is for one of general unidirectional DC-DC converter configurations. A zero-voltage zero-current switching (ZVZCS) circuit is added to this configuration.

In other words, a series circuit of auxiliary (second) inductor 108b, diode 111, and auxiliary (second) switching element IGBT104 is connected across main (first) switching element IGBT101 (between ends "c" and "b"). Diode 105 is back-to-back connected to this auxiliary switching element IGBT104, too. Further, auxiliary (second) inductor 108b is magnetically coupled with main (first) inductor 108a.

Figure 2:
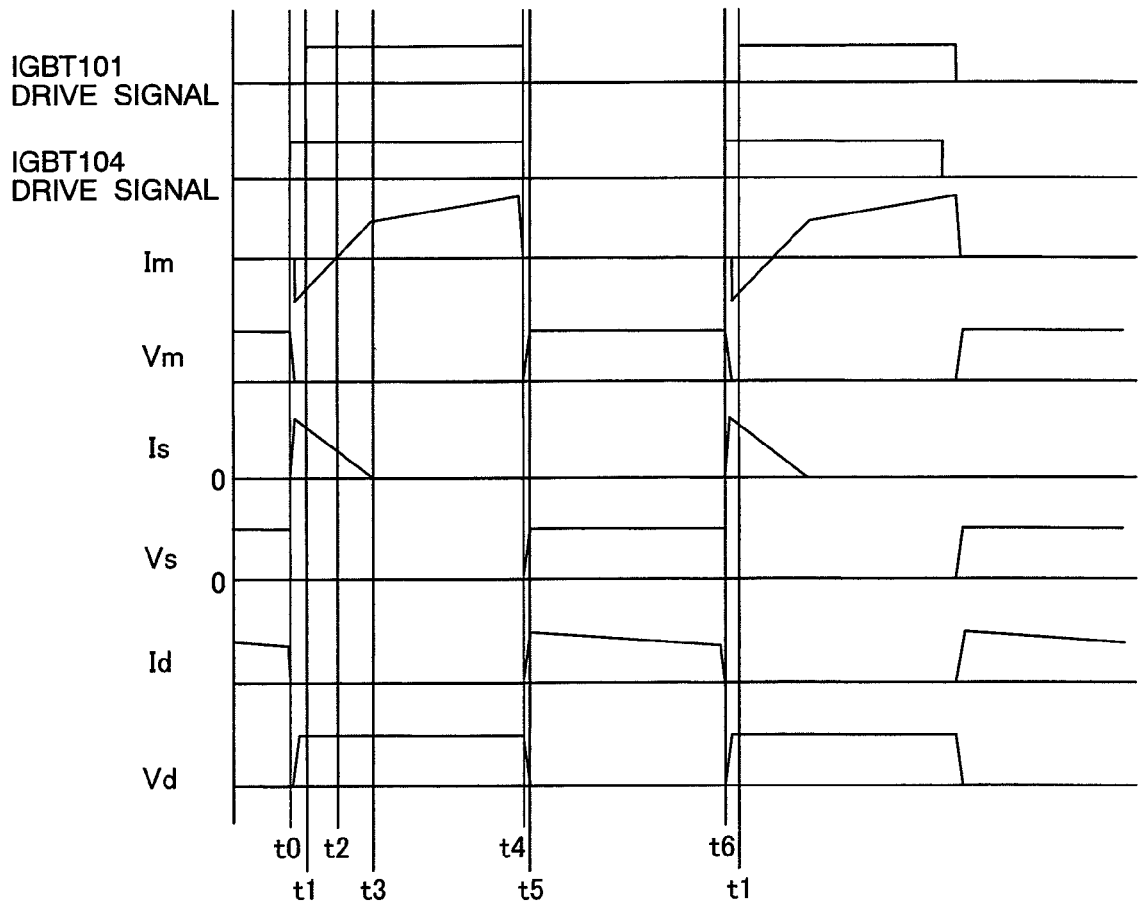
FIG. 2 shows voltage and current waveforms of each component to explain the operation of the unidirectional DC-DC converter which is the first embodiment of this invention.

FIG. 2 shows voltage and current waveforms of each component to explain the operation of the unidirectional DC-DC converter which is the first embodiment of this invention. The operation of the first embodiment of this invention will be explained in detail referring to FIG. 2. First, at time t0 or earlier, no driving signal is applied to gates of main and auxiliary switching elements IGBT101 and IGBT104. Both IGBT101 and IGBT104 are in the OFF state. At time t0, when the driving signal of auxiliary IGBT104 is turned on, charge (energy) stored in snubber capacitor 103 is discharged into the loop of snubber capacitor 103, auxiliary inductor 108b, diode 111, auxiliary IGBT104, and snubber capacitor 103 and the charge are extracted. The gradient (di/dt) of current caused by this extraction is made low by the leakage inductance of auxiliary inductor 108b. This makes zero-current switching (ZCS) moderate and can reduce the turn-on loss of auxiliary IGBT104. When auxiliary IGBT104 turns on, energy stored in auxiliary IGBT104 flows as current Is (or −Im) in the loop of inductor 108b, diode 111, auxiliary IGBT104, diode 102, and inductor 108b. Therefore, when a driving signal is applied to main IGBT101 at time t1 just after this current flow, main IGBT101 is turned on while current flows through diode 102. In other words, main IGBT101 can perform zero-voltage switching (hereinafter called ZVS) and zero-current switching (hereinafter called ZCS). Accordingly, this can suppress a switching loss due to turning-on of main IGBT101.

Next, at time t2, current starts to flow through main IGBT101. At time t3, current does not flow through the loop of inductor 108b, diode 111, auxiliary IGBT104, diode 102, and inductor 108b. Contrarily, current flows through a line of positive electrode "a" of the DC power supply, inductor 108a, main IGBT101, and negative electrode "b" of the DC power supply. Simultaneously, current flows through a line of capacitor 106 and inductor 109.

At time t4, gate driving signals of main and auxiliary IGBT101 and IGBT104 are turned off. First, when current to main IGBT101 is shut off, current flows through a line of the DC power supply, inductor 108a, and snubber capacitor 103. Consequently, the collector-emitter voltage of main IGBT101 increases at dv/dt which is determined by the capacitance and breaking current value of snubber capacitor 103. In other words, it is possible to enable ZVS and reduce the turn-off loss by moderating the change rate (dv/dt) of the collector-emitter voltage of main IGBT101 by snubber capacitor 103. However, since no current flows through auxiliary IGBT104 at time t3 and later, no turn-off loss occurs when a turn-off is made at time t4. Energy stored in main conductor 108a is sent to capacitor 110 via capacitor 106 and diode 107 and stored there. Similarly, energy stored in inductor 109 is stored in capacitor 110 via diode 107, too.

Later, when auxiliary IGBT104 is turned on at time t6, charge (energy) stored in snubber capacitor 103 is discharged into the loop of snubber capacitor 103, auxiliary inductor 108b, diode 111, auxiliary IGBT104, and snubber capacitor 103 and the charge is extracted. The gradient (di/dt) of current caused by this extraction is made low by the leakage inductance of auxiliary inductor 108b. This makes zero-current switching (ZCS) moderate and can reduce the turn-on loss. When auxiliary IGBT104 is turned on earlier by $\Delta t$ (wherein $\Delta t$ is a difference between time t6 and time t1) than main IGBT101, the charge of snubber capacitor 103 is discharged and the rush current of main IGBT101 can be suppressed. This time difference $\Delta t$ becomes optimum just when the collector-emitter voltage of main IGBT101 becomes 0V. In other words, main IGBT101 is turned on most efficiently at this timing.

Figure 3:
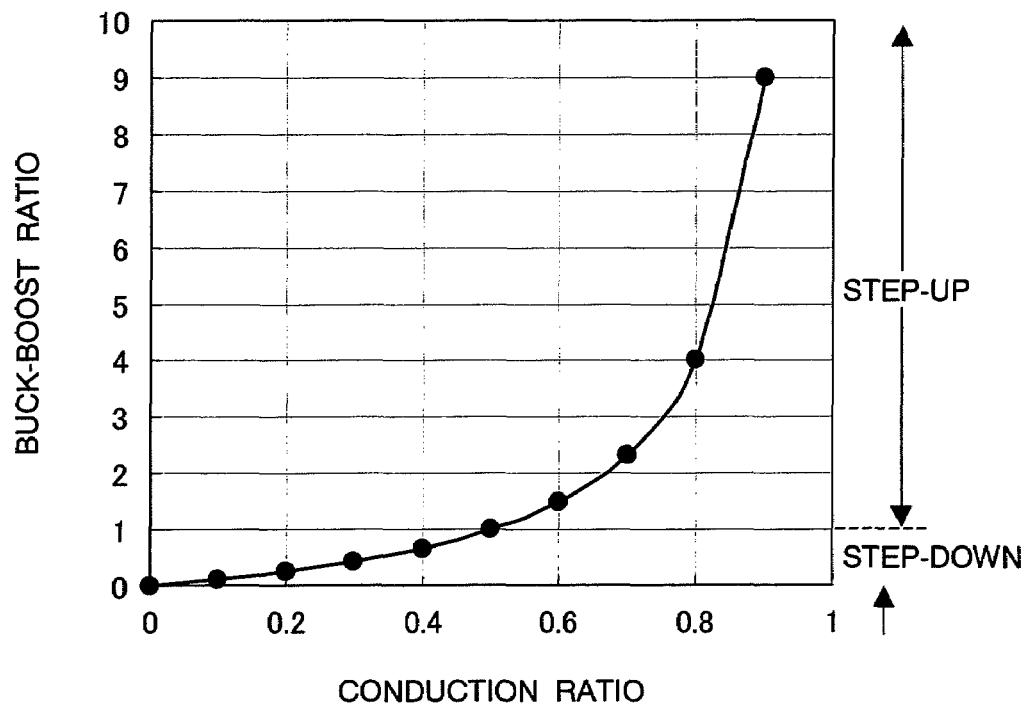
FIG. 3 shows a graph which indicates the relationship of buck-boost rate and conduction rate of main IGBT101.

FIG. 3 shows a graph which indicates the relationship of buck-boost rate and conduction rate of main IGBT101. Here, the buck-boost rate is defined as a rate of output voltage to input voltage. When the buck-boost rate is less than 1.0, the operation is a step-down operation. When the buck-boost rate is more than 1.0, the operation is a step-up operation. As shown in FIG. 3, the buck-boost rate becomes 1.0 when the conduction rate of main IGBT101 is 0.5. When the conduction rate is less than 0.5, the step-down operation is enabled. When the conduction rate is greater than 0.5, the step-up operation is enabled.

Diode 111 can be omitted when auxiliary IGBT104 is of a reverse voltage prevention type.

This embodiment is configured as explained below. The unidirectional DC-DC converter of this embodiment is equipped with a first switching element 101 which supplies and shuts current from a DC power supply (1 to 5) to a first inductor 108a, a diode 102 which is connected in inverse parallel to the first switching element 101, and a snubber capacitor 103 which is connected in parallel to the first switching element 101. The DC-DC converter is equipped with a control unit (not shown in the drawing) which turns on and off the first switching element 101 and controls its duty. Further, the DC-DC converter is equipped with circuit means (104, 108b, and 111) which applies current to the back-to-back-connected diode 102 in a short period (t0 to t2) including a time period in which the first switching element 101 is on. Further, the unidirectional DC-DC converter is equipped with a diode 107 which discharges the energy from the inductor 108a to the output side. Furthermore, the unidirectional DC-DC converter is equipped with a second inductor 108b which is magnetically coupled with the first inductor 108a and a second switching element 104 which applies current to the back-to-back-connected diode 102 by using energy which is stored in this inductor 108b.

With the use of an auxiliary resonance circuit which comprises auxiliary inductors, auxiliary switching element IGBT104, diode 111, and snubber capacitor 103, the unidirectional DC-DC converter of this embodiment enables ZVS, ZCS turn-on, and ZVS turn-off and can greatly reduce switching-related losses. Further, since the DC-DC converter of this embodiment can greatly reduce switching-related losses, the DC-DC converter can increase its operating frequency. This can reduce sizes and costs of inductors and capacitors. Further, the DC-DC converter can output step-down and step-up voltages by controlling the conduction rate of main IGBT101.

Embodiment 2

Figure 4:
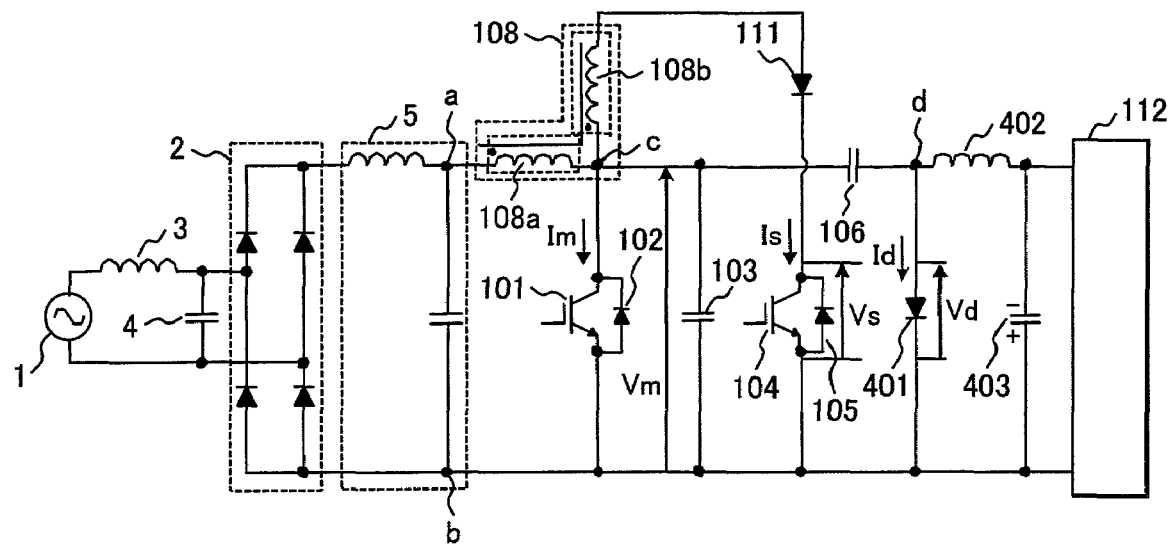
FIG. 4 shows the schematic diagram of the main circuit of the unidirectional DC-DC converter which is the second embodiment of this invention.

FIG. 4 shows the schematic diagram of the main circuit of the unidirectional DC-DC converter which is the second embodiment of this invention. This embodiment is also a buck-boost soft-switching type unidirectional DC-DC converter. Since elements of FIG. 4 are identical to those of FIG. 1, like elements are given like reference characters. The description of the elements is omitted if it is already given in Embodiment 1.

The second embodiment is the same as the first embodiment except for how to take out an output voltage from both ends "c" and "b" of main switching element IGBT101. The connection of diode 107 and third inductor 109 of FIG. 1 is reversed in the structure of FIG. 4. In other words, a series circuit of capacitor 106 and diode 401 is connected across main IGBT101 (between both ends "c" and "b") and a series circuit of third inductor 402 and capacitor 110 is connected across this diode 401 (between both ends "d" and "b"). Both ends of this capacitor 110 are the output terminals of the unidirectional DC-DC converter and load 112 is connected to these output terminals.

Next will be explained the operation of the second embodiment. The voltage and current waveforms of the second embodiment are completely the same as those of FIG. 2. Main IGBT101 can perform zero-voltage switching (hereinafter called ZVS) and zero-current switching (hereinafter called ZCS) by turning on main IGBT101 while current flows through diode 102. This can suppress turn-on switching losses. It is possible to enable ZVS and reduce the turn-off loss by moderating the change rate (dv/dt) of the collector-emitter voltage of main IGBT101 by snubber capacitor 103. Further, when auxiliary IGBT104 is turned off, no current flows through auxiliary IGBT104 and no turn-off loss occurs.

A difference between structures of FIG. 1 and FIG. 4 is that energy stored in inductor 108a flows through diode 401 so as to charge capacitor 105. Energy (charge) stored in third inductor 402 is transferred to capacitor 110 through diode 401 and stored in capacitor 110. This charged energy generates a voltage whose polarity is opposite to that of the input voltage. In other words, point "b" has a higher potential.

The relationship of buck-boost rate and conduction rate of main IGBT101 of this embodiment is the same as that of FIG. 3.

Embodiment 3

Figure 5:
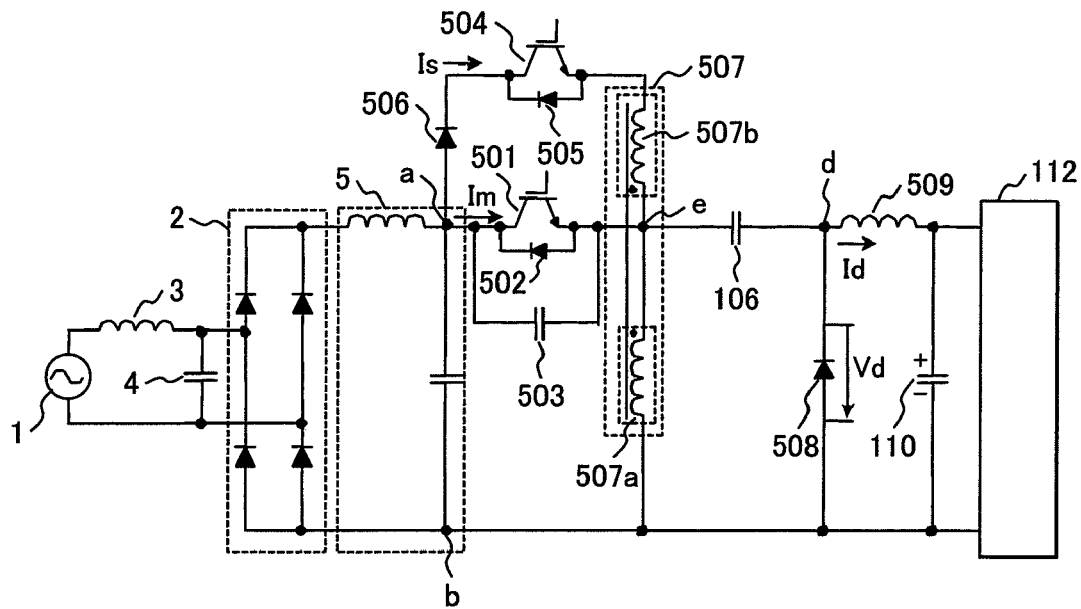
FIG. 5 shows the schematic diagram of the main circuit of the unidirectional DC-DC converter which is the third embodiment of this invention.

FIG. 5 shows the schematic diagram of the main circuit of the unidirectional DC-DC converter which is the third embodiment of this invention. This embodiment is also a buck-boost soft-switching type unidirectional DC-DC converter. Since elements of FIG. 5 are identical to those of FIG. 1 and FIG. 4, like elements are given like reference characters. The description of the elements is omitted if it is already given in the above embodiments.

In the main circuit of FIG. 5, a series circuit of main IGBT501 and main inductor 507a is connected across a DC power supply (between terminals of "a" and "b"). Diode 502 is back-to-back connected to main IGBT501 and snubber capacitor 503 is connected in parallel to main IGBT501. A series circuit of capacitor 106 and diode 508 is connected across main inductor 507a (between ends "e" and "b"). A series circuit of third inductor 509 and capacitor 110 is connected across this diode 508 (between ends "d" and "b"). Both ends of this capacitor 110 are the output terminals of the unidirectional DC-DC converter and load 112 is connected to these output terminals.

A series circuit of diode 506, auxiliary IGBT504, and auxiliary (second) inductor 507b is connected across main IGBT501 (between ends "a" and "e"). Diode 505 is back-to-back connected to auxiliary IGBT504.

Next will be explained the operation of the second embodiment. The voltage and current waveforms of the third embodiment are completely the same as those of FIG. 2. First, the operation of this embodiment will be explained by referring to FIG. 2. When main and auxiliary switching elements (IGBT501 and IGBT504) are off. In this case, no driving signal is applied to gates of main and auxiliary switching elements (IGBT501 and IGBT504). Consequently, main and auxiliary switching elements (IGBT501 and IGBT504) are off and no current flows. Next, the operation of the unidirectional DC-DC converter of this embodiment in a time period from t1 to t6 will be explained below. At t1, a driving signal is applied to main IGBT501, but energy stored in auxiliary IGBT507b causes current Is (or −Im) to flow in the loop of inductor 507b, diodes 502 and 506, and auxiliary IGBT504. Therefore, no current flows through main IGBT501. In other words, the unidirectional DC-DC converter of this embodiment enables ZVS and ZCS and suppresses switching losses by turning on main IGBT501 while current flows through diode 502. Then, at time t2, current starts to flow through IGBT501. At time t3, current does not flow through a line of inductor 507b, diode 502, diode 111, and auxiliary IGBT504. Meanwhile, current flows through a line of inductor 507a and main IGBT501 and through a line of capacitor 106 and inductor 509. At time t4, when main and auxiliary switching elements (IGBT501 and IGBT504) are turned off, current to main IGBT501 is shut off. From time t4 to time t5, current flows from the power supply to inductor 507a and snubber capacitor 503. The collector-emitter voltage of main IGBT501 increases at a change rate (dv/dt) which is determined by the capacitance and breaking current value of snubber capacitor 503. In other words, it is possible to enable ZVS and reduce the turn-off loss by moderating the change rate (dv/dt) of the collector-emitter voltage of main IGBT101 by snubber capacitor 503. However, since no current flows through auxiliary IGBT504, no turn-off loss occurs. Energy stored in main conductor 507a causes current to flow to capacitor 106 via diode 508 and charge the capacitor. Similarly, energy stored in inductor 509 causes current to flow to capacitor 110 and diode 508 and charge the capacitor. At time t6, when auxiliary IGBT504 is turned on, charge stored in snubber capacitor 503 causes current to flow through a loop of inductor 508b, snubber capacitor 503, diode 506, auxiliary IGBT504, and inductor 507b. Consequently, charge is extracted from snubber capacitor 503. The gradient (di/dt) of current caused by this extraction is made low by the leakage inductance of inductor 507b. This moderates zero-current switching (ZCS) and can reduce the turn-on loss. When auxiliary IGBT504 is turned on earlier by Δt (wherein Δt is a difference between time t6 and time t1) than main IGBT501, the charge of snubber capacitor 103 is discharged and the rush current of main IGBT501 can be suppressed. This time difference Δt becomes optimum just when the collector-emitter voltage of main IGBT501 becomes 0V. In other words, main IGBT501 is turned on most efficiently at this timing.

The relationship of buck-boost rate and conduction rate of main IGBT501 of this embodiment is the same as that of the first embodiment (see FIG. 3).

As described above, with the use of an auxiliary resonance circuit which comprises IGBT, diode, snubber capacitor, and inductor, the unidirectional DC-DC converter of this embodiment enables ZVS, ZCS turn-on, and ZVS turn-off and can greatly reduce switching-related losses. Further, since the DC-DC converter of this embodiment can greatly reduce switching-related losses, the DC-DC converter can increase its operating frequency. This can reduce sizes and costs of inductors and capacitors. Further, the DC-DC converter can perform high-precision step-down and step-up operations by controlling the conduction rate of main IGBT501.

Embodiment 4

Figure 6:
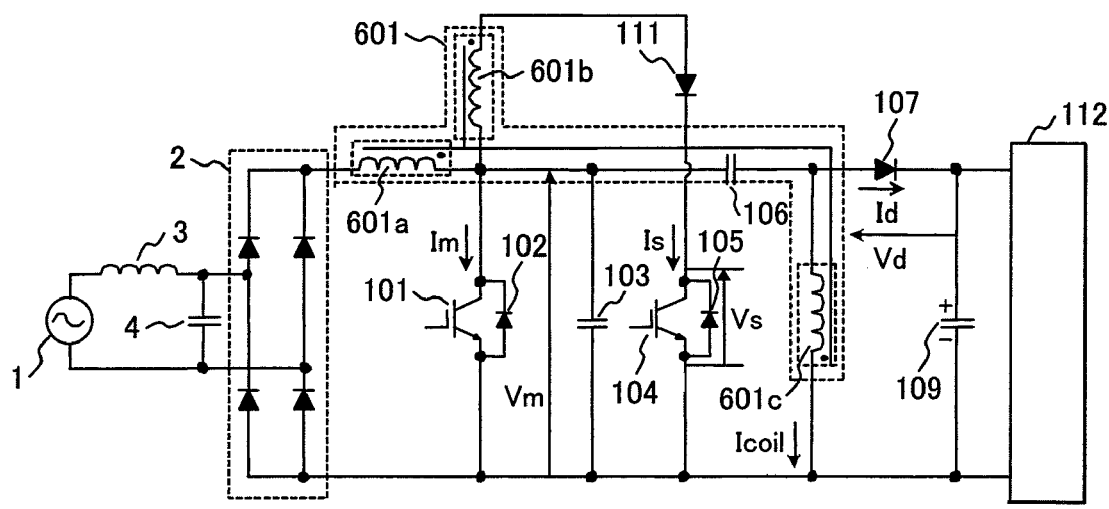
FIG. 6 shows the schematic diagram of the main circuit of the unidirectional DC-DC converter which is the fourth embodiment of this invention.

FIG. 6 shows the schematic diagram of the main circuit of the unidirectional DC-DC converter which is the fourth embodiment of this invention. This embodiment is also a buck-boost soft-switching type unidirectional DC-DC converter. Since elements of FIG. 6 are identical to those of FIG. 1, FIG. 4, and FIG. 5, like elements are given like reference characters. The description of the elements is omitted if it is already given in the above embodiments.

The configuration of FIG. 6 will be explained below. FIG. 6 is basically the same as FIG. 1 but inductor 601 is a 3-winding coupled inductor.

Figure 7:
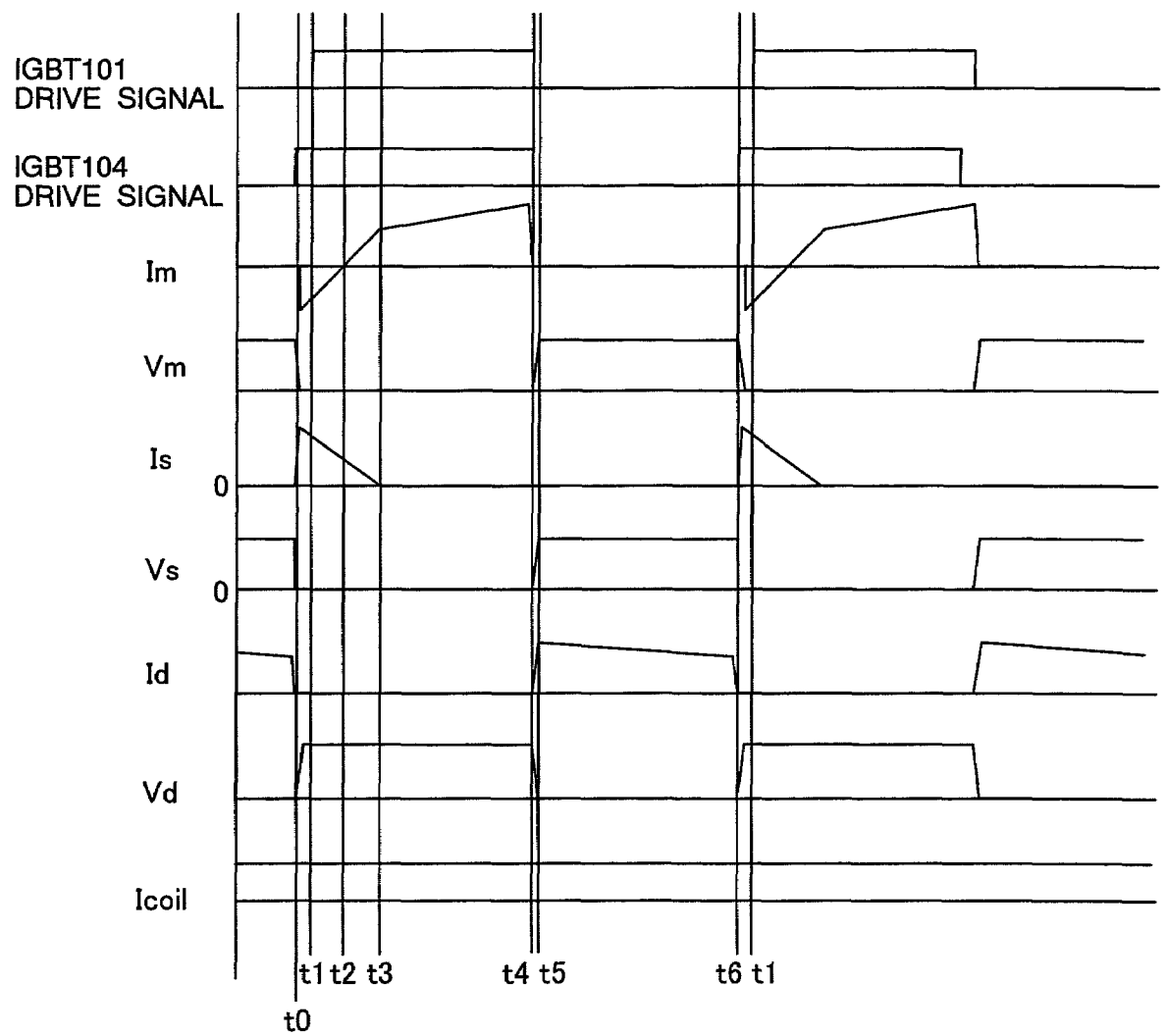
FIG. 7 shows voltage and current waveforms of each component to explain the operation of the unidirectional DC-DC converter which is the fourth embodiment of this invention.

FIG. 7 shows voltage and current waveforms of each component to explain the operation of the unidirectional DC-DC converter which is the fourth embodiment of this invention.

The operation of the fourth embodiment of this invention is the same as that of the first embodiment but inductor 601*c* is connected to inductor 601*a* and consequently the voltage on inductor 601*c* is polarized opposite to the voltage stored in capacitor 106. Therefore, the voltage applied to inductor 501*c* reduces and the change rate (di/dt) of current Icoil becomes smaller as shown in FIG. 7. Consequently, the flux change becomes smaller inside the cores of inductors 601*a* to 601*c*. This reduces losses in the cores.

As described above, inductors are respectively wound on a single core in this embodiment. This structure can suppress the flux changes inside cores and greatly reduce core losses. Further, this structure can also suppress current changes and consequently reduce inductor winding losses. Furthermore, wires wound on the cores need not be litz wires and other expensive wires. Any single wires can be used. This can reduce the product cost of the inductors.

Embodiment 5

Figure 8:
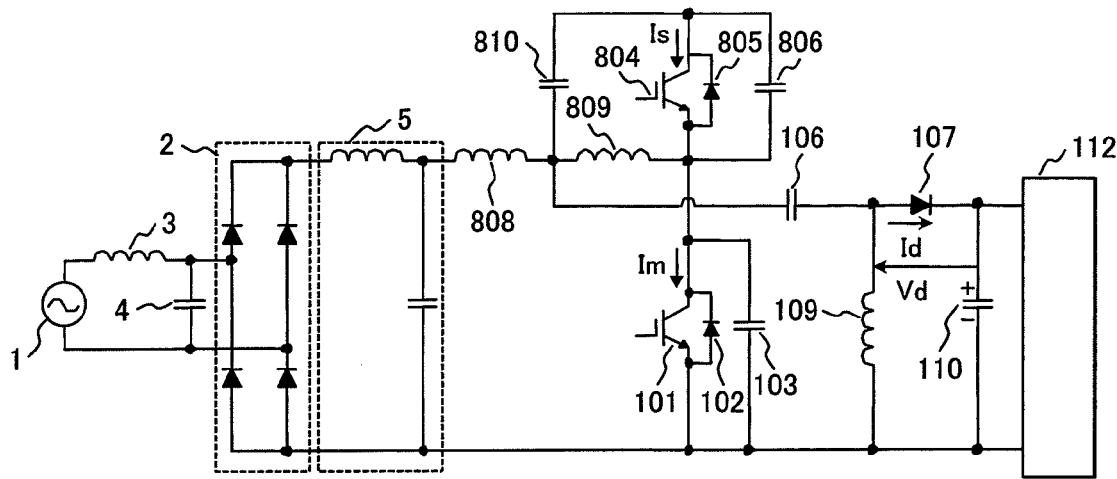
FIG. 8 shows the schematic diagram of the main circuit of the unidirectional DC-DC converter which is the fifth embodiment of this invention.

FIG. 8 shows the schematic diagram of the main circuit of the unidirectional DC-DC converter which is the fifth embodiment of this invention. This embodiment is also a buck-boost soft-switching type unidirectional DC-DC converter. Since elements of FIG. 8 are identical to those of FIG. 1 to FIG. 7, like elements are given like reference characters. The description of the elements is omitted if it is already given in the above embodiments.

The configuration of FIG. 8 will be explained below. Similarly to the first embodiment, the fifth embodiment is equipped with first switching element 101 between terminals "a" and "b" of the DC power supply to supply and shut current of first inductor 808. Further, similarly to the first embodiment, the fifth embodiment is equipped with diode 102 which is back-to-back connected to first switching element 101 and snubber capacitor 103 which is connected in parallel to first switching element 101. Similarly, the fifth embodiment is also equipped with a control unit which turns on and off the first switching element and controls its duty and diode 107 which discharges energy from inductor 808 to the output.

However, the fifth embodiment is different from the first embodiment in the configuration of a circuit means which applies current to back-to-back-connected diode 102 in a short time period including the time in which first switching element 101 is turned on. In other words, the circuit means is equipped with second inductor 809 in a current line from the DC power supply to first inductor 808 and first switching element 101. Further, the circuit means is equipped with second switching element 804 which applies current to back-to-back connected diode 102 by using energy stored in second inductor 809. Substantially, a series circuit of capacitor 810 and auxiliary (second) switching element 804 is connected across second inductor 809. Diode 805 is back-to-back connected to auxiliary switching element 804 and snubber capacitor 806 is connected in parallel to auxiliary switching element 804.

Figure 9:
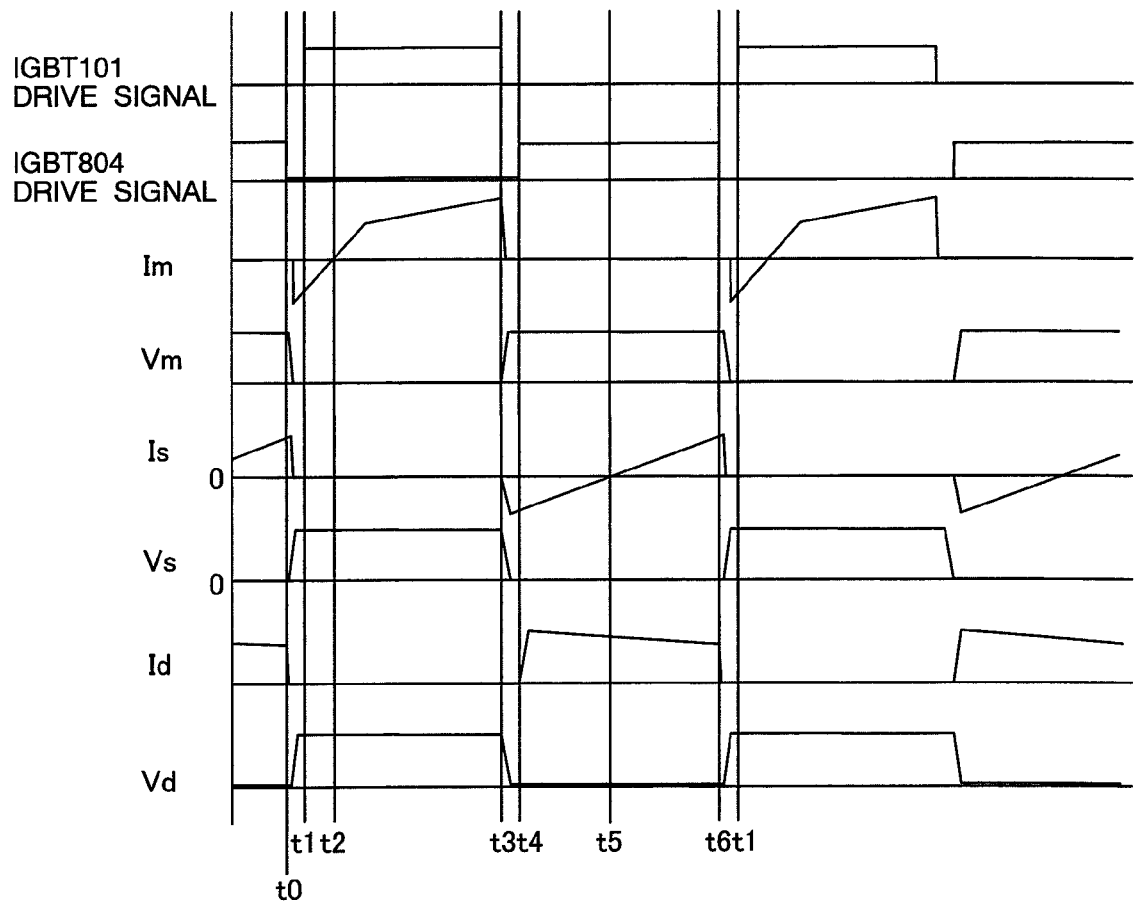
FIG. 9 shows voltage and current waveforms of each component to explain the operation of the unidirectional DC-DC converter which is the fifth embodiment of this invention.

FIG. 9 shows voltage and current waveforms of each component to explain the operation of the unidirectional DC-DC converter which is the fifth embodiment of this invention. The operation of the fifth embodiment of this invention will be explained in detail referring to FIG. 9. When main IGBT101 and auxiliary IGBT804 are off, the operation of the fifth embodiment is identical to that of the first embodiment. At time t1, a driving signal is applied to main IGBT101. However, no current flows through main IGBT101 since current "−Im" is flowing through the line (loop) of main inductor 809, capacitor 106, diode 807, capacitor 110, and diode 102 by using energy stored in main inductor 809. This enables main IGBT101 to perform ZVS and ZCS turn-on. Next, when all energy is discharged from main inductor 808 at time t2, main IGBT101 becomes conductive and current flows from the DC power supply to a series circuit of main inductor 808, auxiliary inductor 809, and main IGBT101. Simultaneously, current flows through a loop of inductor 109, capacitor 106, auxiliary inductor 809, main IGBT101, and inductor 109. At time t3, when main IGBT101 is turned off, current flows from the DC power supply to a line of main inductor 808, auxiliary inductor 809, and snubber capacitor 103. Similarly, current flows through a line of capacitor 106, auxiliary inductor 809, snubber capacitor 103, and inductor 109. The collector-emitter voltage of main IGBT101 goes up at dv/dt which is determined by the capacitance and breaking current value of snubber capacitor 103. In other words, it is possible to enable ZVS and reduce the turn-off loss by moderating the change rate (dv/dt) of the collector-emitter voltage of main IGBT101 by snubber capacitor 103. Energy stored in auxiliary inductor 809 causes current to flow through a line of diode 805 and capacitor 810. Further, energy stored in main inductor 808 causes current to flow through a line of capacitor 106, diode 107, and capacitor 110 and a line of inductor 109 and diode 107. Thus the energy is supplied to load 112. Next, at time t4, an ON signal is applied to auxiliary IGBT804, but no current flows through IGBT804 since diode 805 is conductive during this time period. In other words, this enables ZVS and ZCS turn-on. At time t5, energy of auxiliary inductor 809 is completely discharge and current flows through a line of capacitor 810, auxiliary IGBT804, and auxiliary inductor 809. Next, at time t6, when auxiliary IGBT804 is shut off, current flows through a line of capacitor 810, capacitor 806, and auxiliary inductor 809. The voltage across IGBT804 increases at dv/dt which is determined by the capacitance and breaking current value of snubber capacitor 806. In other words, it is possible to enable ZVS and reduce the turn-off loss by moderating the change rate (dv/dt) of the collector-emitter voltage of main IGBT804 by snubber capacitor 806.

As described above, with the use of an auxiliary resonance circuit which comprises IGBT, capacitor, and inductor, the unidirectional DC-DC converter of this embodiment enables ZVS, ZCS turn-on, and ZVS turn-off and can greatly reduce switching-related losses. Further, since the DC-DC converter of this embodiment can greatly reduce switching-related losses, the DC-DC converter can increase its operating frequency. This can reduce sizes and costs of inductors and capacitors. Further, the DC-DC converter can output step-down and step-up voltages by controlling the conduction rate of main IGBT101.

Embodiment 6

Figure 10:
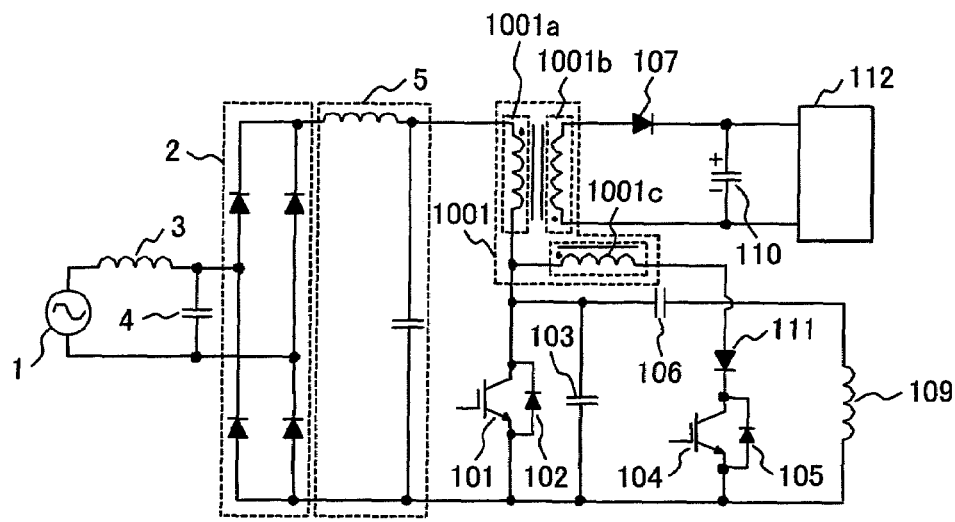
FIG. 10 shows the schematic diagram of the main circuit of the unidirectional DC-DC converter which is the sixth embodiment of this invention.

FIG. 10 shows the schematic diagram of the main circuit of the unidirectional DC-DC converter which is the sixth embodiment of this invention. This embodiment is also a buck-boost soft-switching type unidirectional DC-DC converter. Since elements of FIG. 10 are identical to those of FIG. 1 to FIG. 8, like elements are given like reference characters. The description of the elements is omitted if it is already given in the above embodiments.

The configuration of main circuit of FIG. 10 will be explained below. Unlike the first embodiment, the main circuit of the sixth embodiment is equipped with main inductor 108*a*, auxiliary inductor 108*b*, and flyback transformers (inductors) 1001*a* to 1001*c*. Further, load 112 is connected to secondary winding 1001*b* of the flyback transformer via a smoothing circuit made of diode 107 and capacitor 110.

The soft-switching operation of the sixth embodiment is the same as that of the first embodiment except for energy transfer by flyback transformers (inductors). This embodiment transfers energy as follows: When main IGBT101 is turned on, current flows through a line of primary winding 1001*a* of flyback transformer 1001 and main IGBT101 and a line of inductor 109, capacitor 106, and main IGBT101. Current flows through flyback transformer 1001*a* while main IGBT101 is on. This current magnetizes the core and stores energy. Next, when main IGBT101 turns off, energy stored in flyback transformer 1001 is discharged to secondary winding 1001*b* to charge diode 107 and capacitor 110 of the smoothing circuit.

As described above, this embodiment which uses flyback transformers as main and auxiliary inductors can accomplish great buck-boost ratios by changing the ratios of primary and secondary windings.

Embodiment 7

Figure 11:
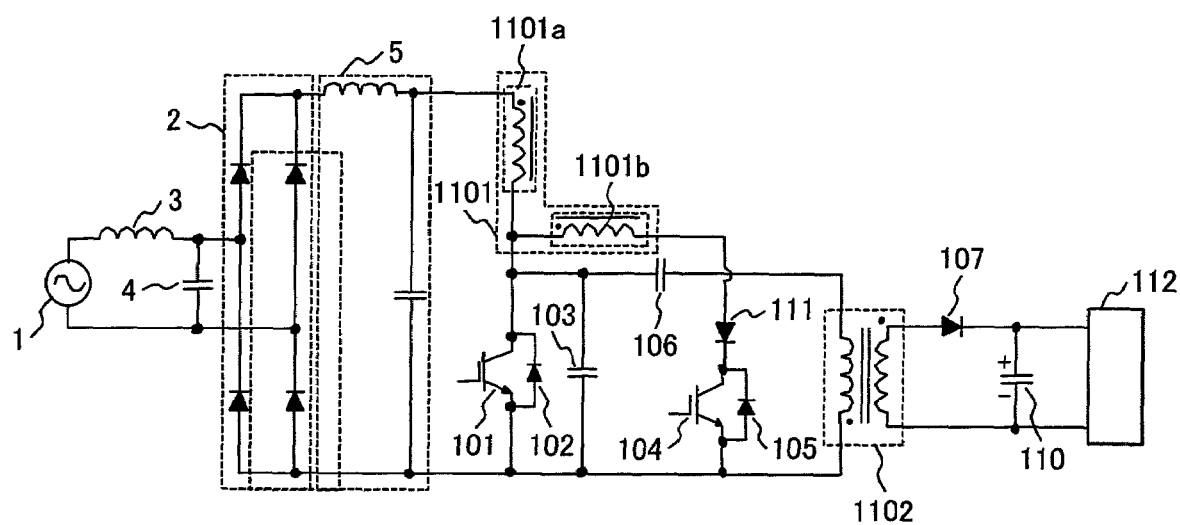
FIG. 11 shows the schematic diagram of the main circuit of the unidirectional DC-DC converter which is the seventh embodiment of this invention.

FIG. 11 shows the schematic diagram of the main circuit of the unidirectional DC-DC converter which is the seventh embodiment of this invention. This embodiment is a buck-boost soft-switching type unidirectional DC-DC converter. Since elements of FIG. 11 are identical to those of FIG. 1 to FIG. 10, like elements are given like reference characters. The description of the elements is omitted if it is already given in the above embodiments.

The configuration of main circuit of FIG. 11 will be explained below. Unlike the first embodiment, the main circuit of the seventh embodiment uses main inductor 109 as flyback transformer (inductor) 1102 and connects load 112 to the secondary winding of flyback transformer 1102 via a smoothing circuit of diode 107 and capacitor 110.

The operation of the seventh embodiment will be explained below. The soft-switching operation of the seventh embodiment is the same as that of the first embodiment except for energy transfer by flyback transformer 1102. This embodiment transfers energy as follows: When main IGBT101 is turned on, current flows through a line of main inductor 1101*a* and main IGBT101 and a line of primary winding of flyback transformer 1102, capacitor 106, and main IGBT101. Current flows through the primary winding of flyback transformer 1102 while main IGBT101 is on. This current magnetizes the core and stores energy there. Next, when main IGBT101 turns off, energy stored in flyback transformer 1102 is discharged to secondary winding to charge diode 107 and capacitor 110 of the smoothing circuit.

As described above, this embodiment which uses flyback transformers can accomplish great buck-boost ratios by changing the ratios of primary and secondary windings.

Embodiment 8

Figure 12:
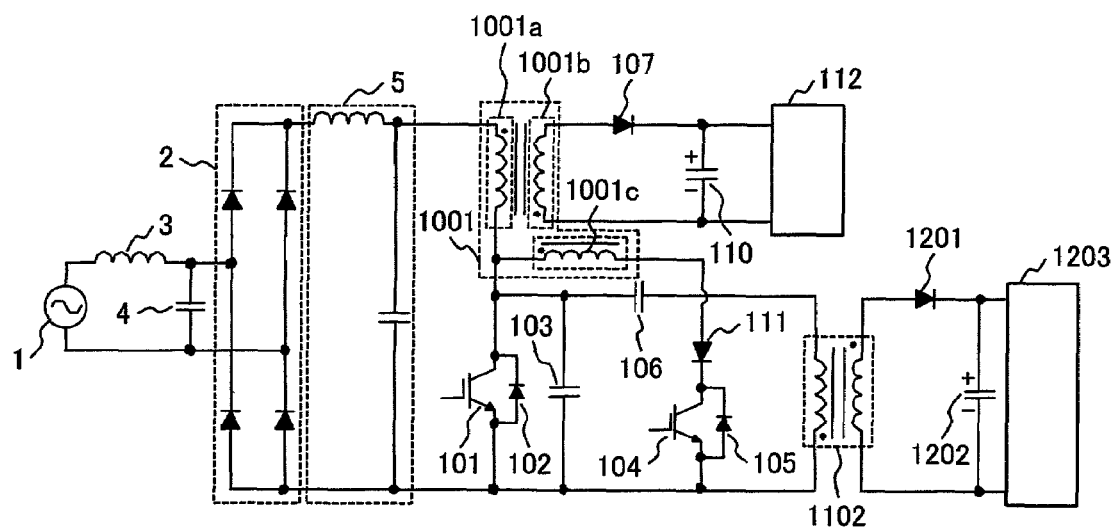
FIG. 12 shows the schematic diagram of the main circuit of the unidirectional DC-DC converter which is the eighth embodiment of this invention.

FIG. 12 shows the schematic diagram of the main circuit of the unidirectional DC-DC converter which is the eighth embodiment of this invention. This embodiment is a buck-boost soft-switching type unidirectional DC-DC converter. Since elements of FIG. 12 are identical to those of FIG. 1 to FIG. 11, like elements are given like reference characters. The description of the elements is omitted if it is already given in the above embodiments.

The configuration of main circuit of FIG. 12 will be explained below. Unlike the first embodiment, the main circuit of the eighth embodiment uses flyback transformers 1001 and 1102 for main inductor 109 and auxiliary inductor 109. The rectification circuit in the secondary side of each flyback transformer of this embodiment is the same as that of each of the sixth and seventh embodiments.

Soft-switching operation of this embodiment is the same as that of the first embodiment. Similarly, the operation of the flyback transformers is the same as those of the sixth and seventh embodiments.

As described above, one main switching element in this embodiment can drive two flyback transformers to respectively supply different voltages. Further, this embodiment enables soft-switching by an auxiliary rectification circuit which consists of an auxiliary switching element, diode, and capacitor. This can reduce switching losses and noises.

Embodiment 9

Figure 13:
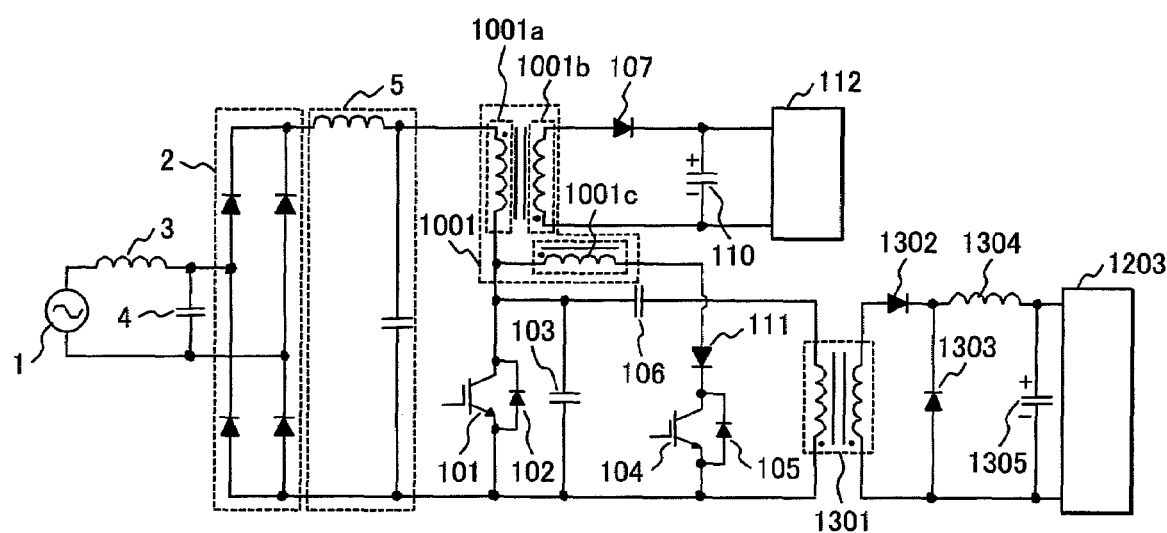
FIG. 13 shows the schematic diagram of the main circuit of the unidirectional DC-DC converter which is the ninth embodiment of this invention.

FIG. 13 shows the schematic diagram of the main circuit of the unidirectional DC-DC converter which is the ninth embodiment of this invention. This embodiment is a buck-boost soft-switching type unidirectional DC-DC converter. Since elements of FIG. 13 are identical to those of FIG. 1 to FIG. 12, like elements are given like reference characters. The description of the elements is omitted if it is already given in the above embodiments.

Unlike the embodiment of FIG. 12, the ninth embodiment uses forward transformer 1301 for flyback transformer 1102. The operation of this embodiment is the same as that of the embodiment of FIG. 12. However, this embodiment is different from the embodiment of FIG. 12 in a method of transferring energy of forward transformer 1301. When main IGBT101 turns on, current flows from the power supply to a line of primary winding 1001*a* of flyback transformer 1001 and main IGBT101 and a line of the primary winding of forward transformer 1301, capacitor 106, and main IGBT101. In this case, forward transformer 1301 generates a voltage (which is determined by the turn ratio) on the secondary winding of the transformer. This voltage causes current to flow through a line of diode 1302, inductor 1304, and capacitor 1305 and charge the capacitor. Next, when main IGBT101 is turned off, current does not flow through the primary winding of forward transformer 1301 and no voltage generates on the second winding. Consequently diode 1302 turns off. Energy stored in inductor 1304 causes current to flow through a line of inductor 1304, capacitor 1305, and diode 1303. Energy stored in inductor 1304 is discharged to capacitor 1305.

Embodiment 10

Figure 14:
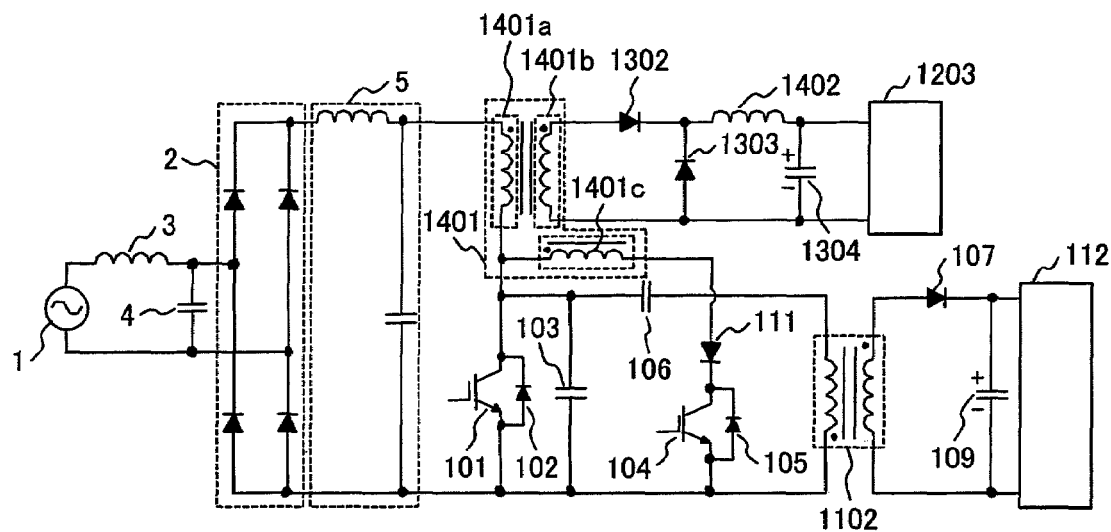
FIG. 14 shows the schematic diagram of the main circuit of the unidirectional DC-DC converter which is the tenth embodiment of this invention.

FIG. 14 shows the schematic diagram of the main circuit of the unidirectional DC-DC converter which is the tenth embodiment of this invention. This embodiment is a buck-boost soft-switching type unidirectional DC-DC converter which uses a forward transformer and a flyback transformer. Since elements of FIG. 14 are identical to those of FIG. 1 to FIG. 13, like elements are given like reference characters. The description of the elements is omitted if it is already given in the above embodiments.

Unlike the embodiment of FIG. 13, the tenth embodiment uses forward transformer 1401 for flyback transformer 1001 and flyback transformer 1102 for forward transformer 1301. The operation of the tenth embodiment is the same as eighth and ninth embodiments.

Embodiment 11

Figure 15:
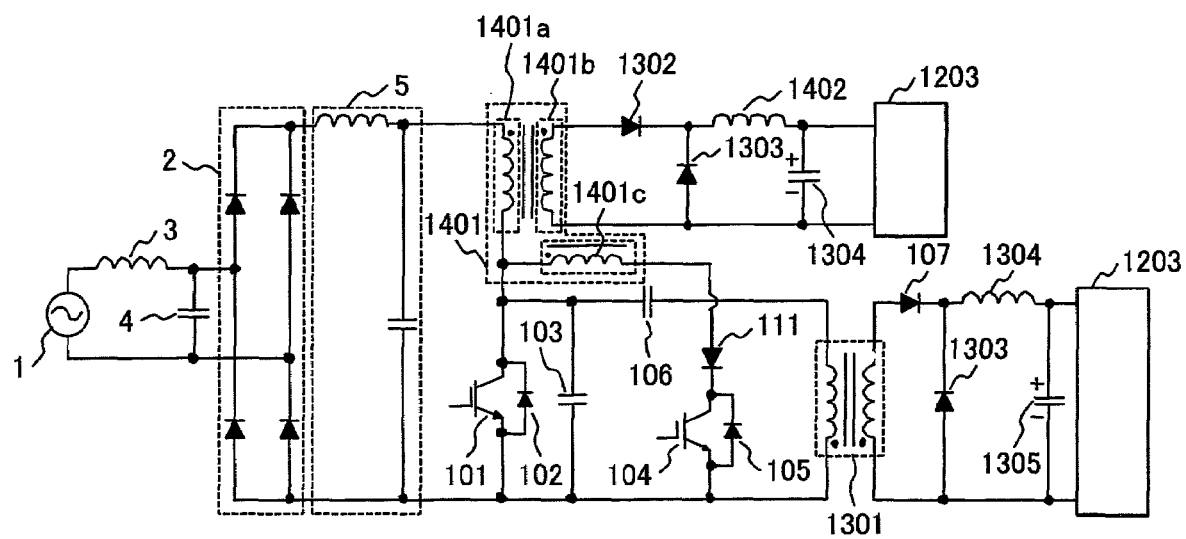
FIG. 15 shows the schematic diagram of the main circuit of the unidirectional DC-DC converter which is the eleventh embodiment of this invention.

FIG. 15 shows the schematic diagram of the main circuit of the unidirectional DC-DC converter which is the eleventh embodiment of this invention. This embodiment is a buck-boost soft-switching type unidirectional DC-DC converter which uses a forward transformer. Since elements of FIG. 15 are identical to that of FIG. 14, like elements are given like reference characters.

Unlike the tenth embodiment, the eleventh embodiment uses forward transformer 1301 for flyback transformer 1102. The operation of the eleventh embodiment is the same as the tenth embodiment.

Embodiment 12

Figure 16:
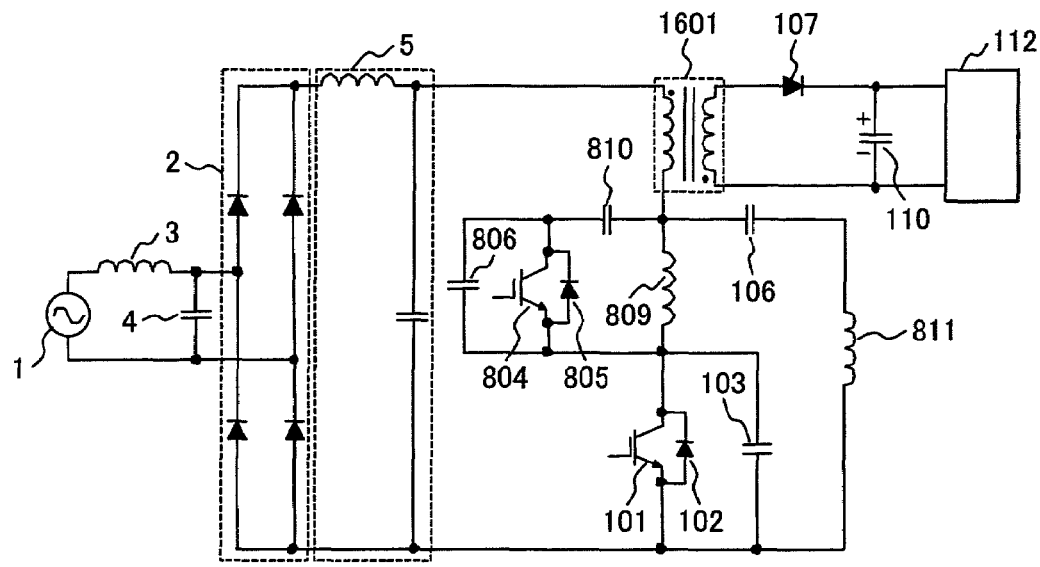
FIG. 16 shows the schematic diagram of the main circuit of the unidirectional DC-DC converter which is the twelfth embodiment of this invention.

FIG. 16 shows the schematic diagram of the main circuit of the unidirectional DC-DC converter which is the twelfth embodiment of this invention. This embodiment is a soft-switching type DC-DC converter which uses a flyback transformer. Since elements of FIG. 16 are identical to that of FIG. 8, like elements are given like reference characters.

Unlike the embodiment of FIG. 8, the twelfth embodiment uses flyback transformer 1601 for main inductor 808. The soft-switching operation of the twelfth embodiment is the same as that of the embodiment of FIG. 8 and the operation of the flyback transformer of this embodiment is the same as that of the embodiment of FIG. 10.

Embodiment 13

Figure 17:
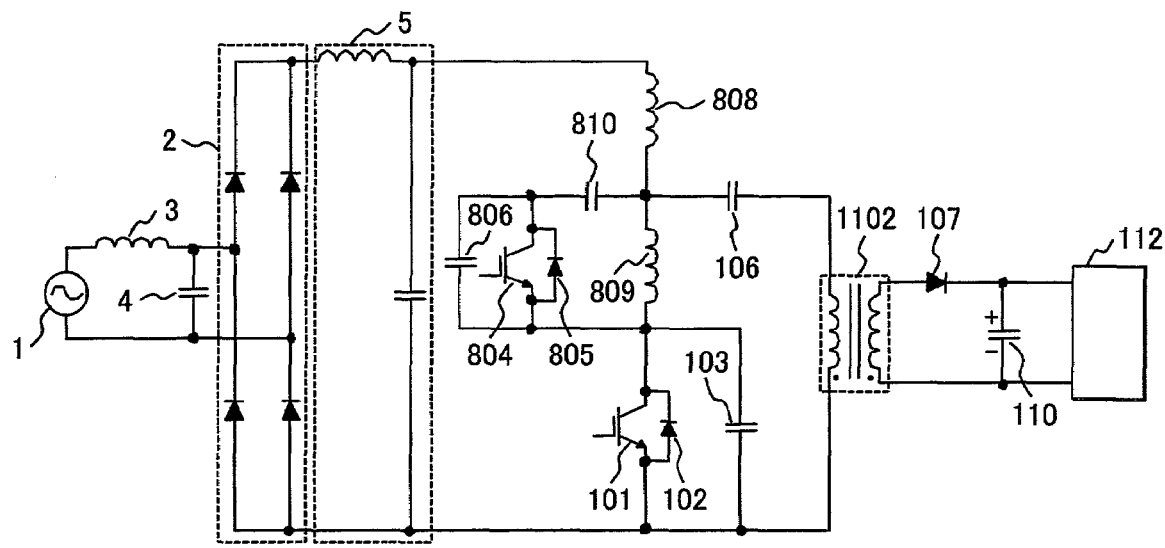
FIG. 17 shows the schematic diagram of the main circuit of the unidirectional DC-DC converter which is the thirteenth embodiment of this invention.

FIG. 17 shows the schematic diagram of the main circuit of the unidirectional DC-DC converter which is the thirteenth embodiment of this invention. This embodiment is a soft-switching type DC-DC converter which uses a flyback transformer. Since elements of FIG. 17 are identical to those of FIG. 8 and FIG. 16, like elements are given like reference characters.

Unlike the embodiment of FIG. 8, the thirteenth embodiment uses flyback transformer 1102 for inductor 109. The soft-switching operation of the thirteenth embodiment is the same as that of the embodiment of FIG. 8 and the operation of the flyback transformer of this embodiment is the same as flyback transformer 1102 of the embodiment of FIG. 11.

Embodiment 14

Figure 18:
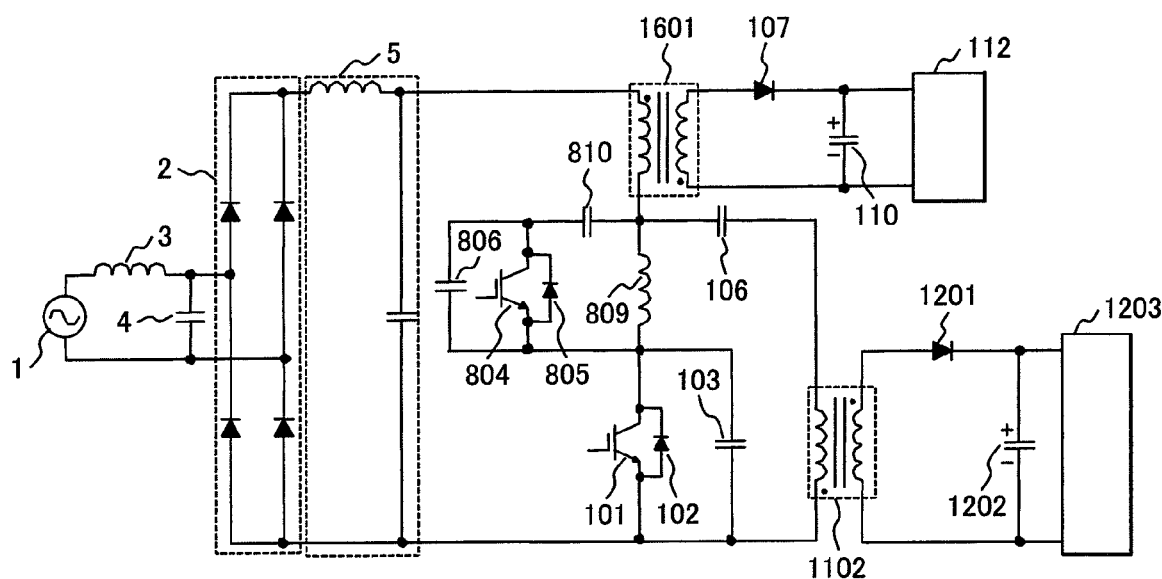
FIG. 18 shows the schematic diagram of the main circuit of the unidirectional DC-DC converter which is the fourteenth embodiment of this invention.

FIG. 18 shows the schematic diagram of the main circuit of the unidirectional DC-DC converter which is the fourteenth embodiment of this invention. This embodiment is a soft-switching type DC-DC converter which uses flyback transformer 1102. Since elements of FIG. 18 are identical to those of FIG. 16 and FIG. 17, like elements are given like reference characters.

Unlike the embodiment of FIG. 17, the fourteenth embodiment uses flyback transformer 1601 for main inductor 808. The soft-switching operation of the fourteenth embodiment is the same as that of the embodiment of FIG. 8 and the operation of the flyback transformer of this embodiment is the same as the flyback transformer of the embodiment of FIG. 12.

Embodiment 15

Figure 19:
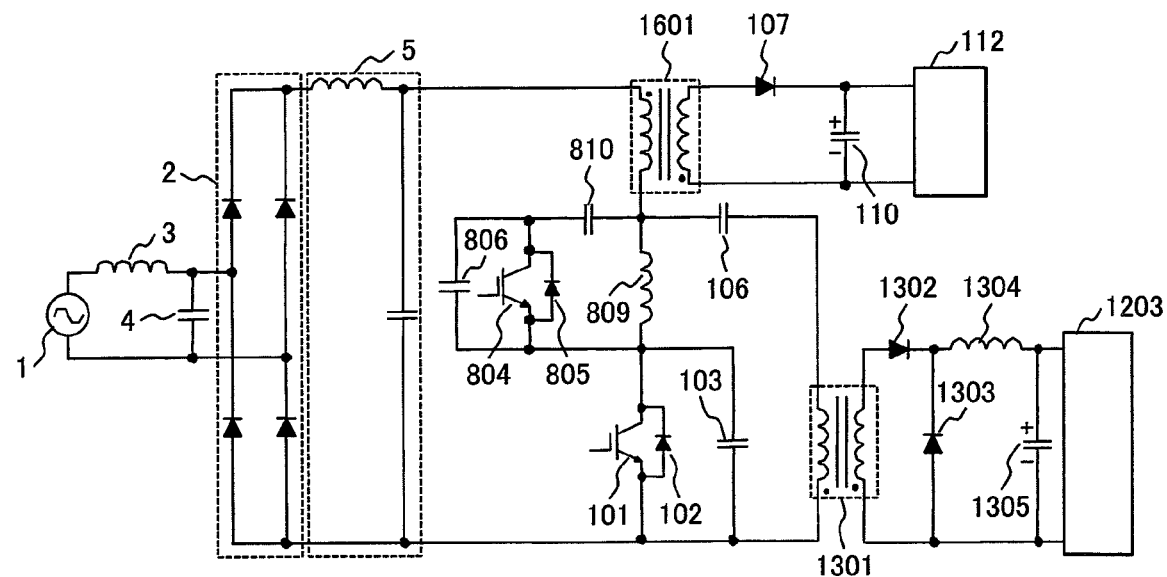
FIG. 19 shows the schematic diagram of the main circuit of the unidirectional DC-DC converter which is the fifteenth embodiment of this invention.

FIG. 19 shows the schematic diagram of the main circuit of the unidirectional DC-DC converter which is the fifteenth embodiment of this invention. This embodiment is a soft-switching type DC-DC converter which uses flyback transformer 1102 and forward transformer 1301. Since elements of FIG. 19 are identical to that of FIG. 18, like elements are given like reference characters.

Unlike the embodiment of FIG. 18, the fifteenth embodiment uses forward transformer 1301 for flyback transformer 1102. The soft-switching operation of the fifteenth embodiment is the same as those of flyback transformer 1001 and forward transformer 1301 of the embodiment of FIG. 13.

Embodiment 16

Figure 20:
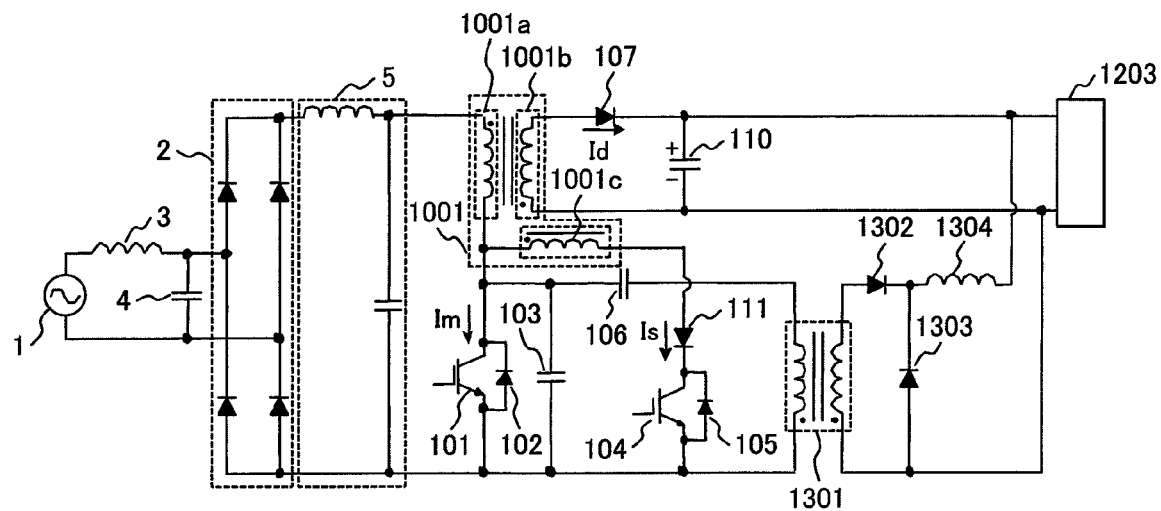
FIG. 20 shows the schematic diagram of the main circuit of the unidirectional DC-DC converter which is the sixteenth embodiment of this invention.

FIG. 20 shows the schematic diagram of the main circuit of the unidirectional DC-DC converter which is the sixteenth embodiment of this invention. This embodiment is a soft-switching type unidirectional DC-DC converter which uses flyback transformer 1001 and forward transformer 1301 and their outputs are connected to an identical load 1203. Since elements of FIG. 20 are identical to that of FIG. 13, like elements are given like reference characters.

Unlike the ninth embodiment (FIG. 13), the embodiment provides a smoothing circuit which consists of diode 1302, inductor 1304, and diode 1303 in the secondary side of forward transformer 1301 and the output of the smoothing circuit is connected to capacitor 110. The operation of this embodiment is the same as that of the ninth embodiment.

Embodiment 17

Figure 21:
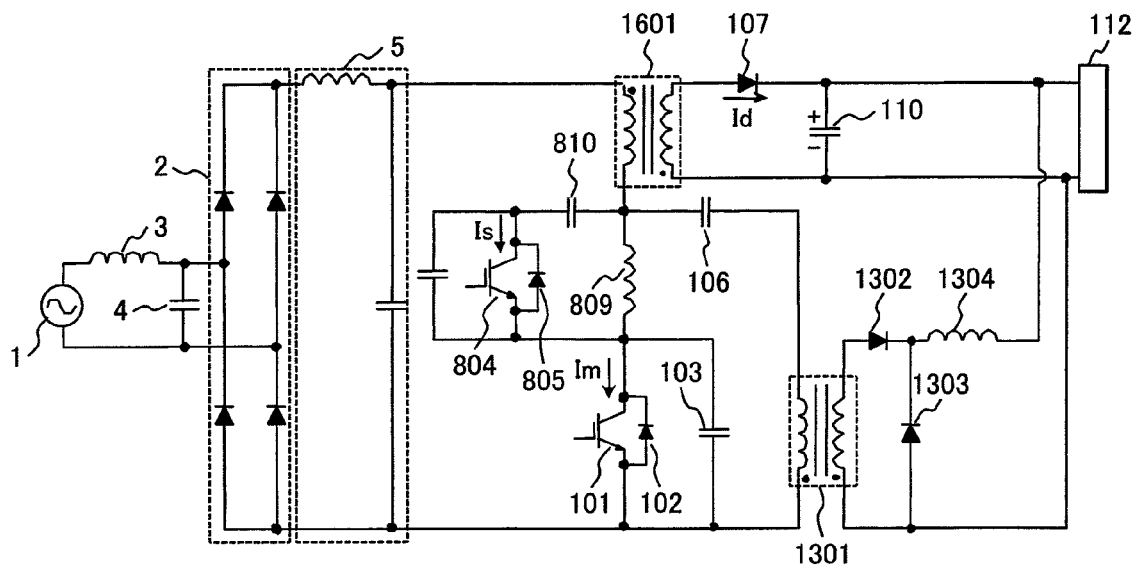
FIG. 21 shows the schematic diagram of the main circuit of the unidirectional DC-DC converter which is the seventeenth embodiment of this invention.

FIG. 21 shows the schematic diagram of the main circuit of the unidirectional DC-DC converter which is the seventeenth embodiment of this invention. This embodiment is a soft-switching type unidirectional DC-DC converter which uses flyback transformer 1601 and forward transformer 1301 and their outputs are connected to identical load 112. Since elements of FIG. 21 are identical to that of FIG. 19, like elements are given like reference characters.

Unlike the fifteenth embodiment (FIG. 19), this embodiment connects the secondary side of forward transformer 1301 to capacitor 110. The operation of this embodiment is the same as the fifteenth embodiment.

Figure 22:
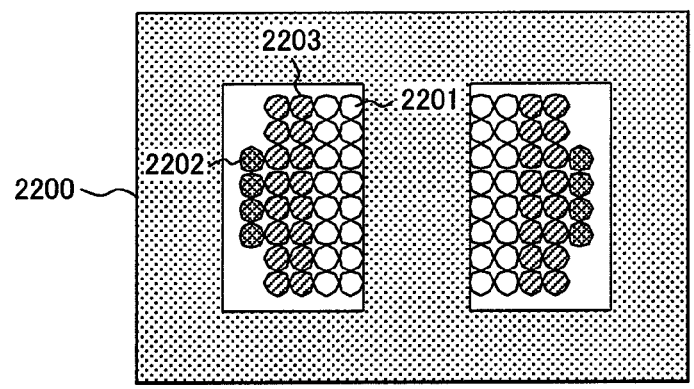
FIG. 22 shows a structural example of inductor that can be applicable to the embodiments of this invention.

FIG. 22 shows a structural example of inductor that can be applicable to the embodiments of this invention. This inductor is preferable as inductor 108 in the first to fourth embodiments.

This inductor is structured as follows: Primary winding 2201 is wound around inductor core 2200. Tertiary winding 2203 is wound around the primary winding. Further, secondary winding 2202 is wound around the tertiary winding. This structure is called a "t" structure. Primary winding 2201 corresponds to inductor 108a. Secondary winding 2202 corresponds to inductor 108b. Tertiary winding 2203 corresponds to inductor 108c.

This structure can downsize the inductors since multiple windings can be wound around a single core.

Figure 23:
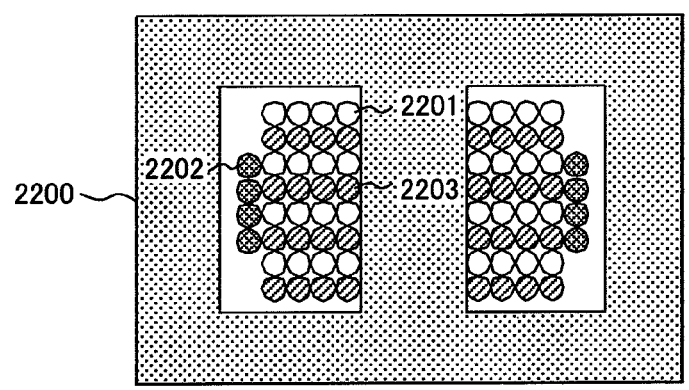
FIG. 23 is a modification of FIG. 22 (1).
Figure 24:
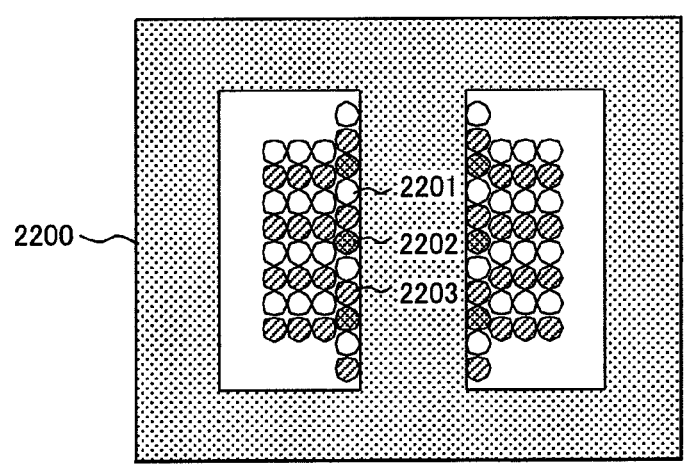
FIG. 24 is a modification of FIG. 22 (2).

FIG. 23 and FIG. 24 are modifications of FIG. 22. In FIG. 23, primary winding 2201 and tertiary winding 2203 are alternately wound around a core and secondary winding 2202 is wound around primary and tertiary windings.

In FIG. 24, primary, secondary, and tertiary windings (2201, 2202, and 2203) are wound in parallel around a single core.

In this way, when wirings are provided closely to each other, magnetic coupling of wirings becomes stronger and this reduces the leakage inductance. This also reduces leakage magnetic field and further reduces core losses, switching losses of circuits, and radiation noises greatly.

Although the wiring structure of inductor 108 is described here, this wiring structure is applicable to forward transformers (1001 and 1102) and forward transformers (1301 and 1401).

Figure 25:
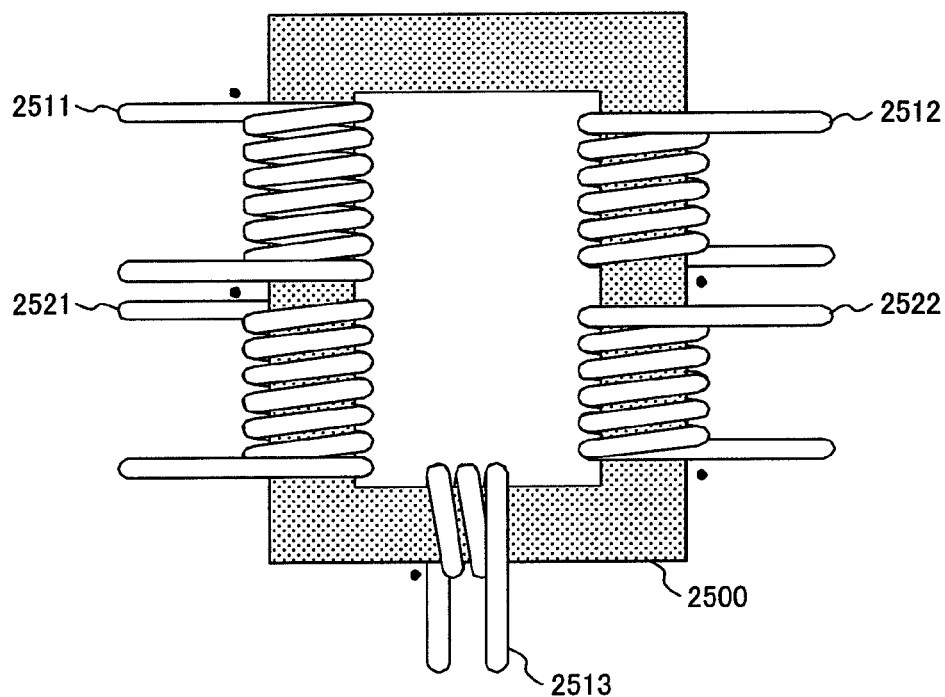
FIG. 25 shows a structural example of a transformer which is applicable to the embodiments of this invention.

FIG. 25 shows a structural example of a transformer which is applicable to the embodiments of this invention. This transformer structure can be applied to transformers 1001, 1102, 1301, 1401, and 1601 in Embodiments 8 to 11 and 14 to 17.

In the wiring structure of the transformer, primary, secondary, and tertiary windings (2511, 2512, and 2513) of the first flyback transformer and primary and secondary windings (2521 and 2522) of the second flyback transformer are wound around troidal core 2500. Primary winding 2511 of the first flyback transformer corresponds to inductor 1101a. Secondary winding 2512 corresponds to inductor 1101b. Primary winding 2521 of the second flyback transformer corresponds to the primary winding of transformer 1102. Secondary winding 2522 corresponds to transformer 1102.

This wiring structure can downsize the inductors since multiple windings can be wound around a single core.

Although the wiring structure of transformer 1101 is described here, this wiring structure is applicable to flyback transformers (1001 and 1102) and forward transformers (1301 and 1401).

Figure 26:
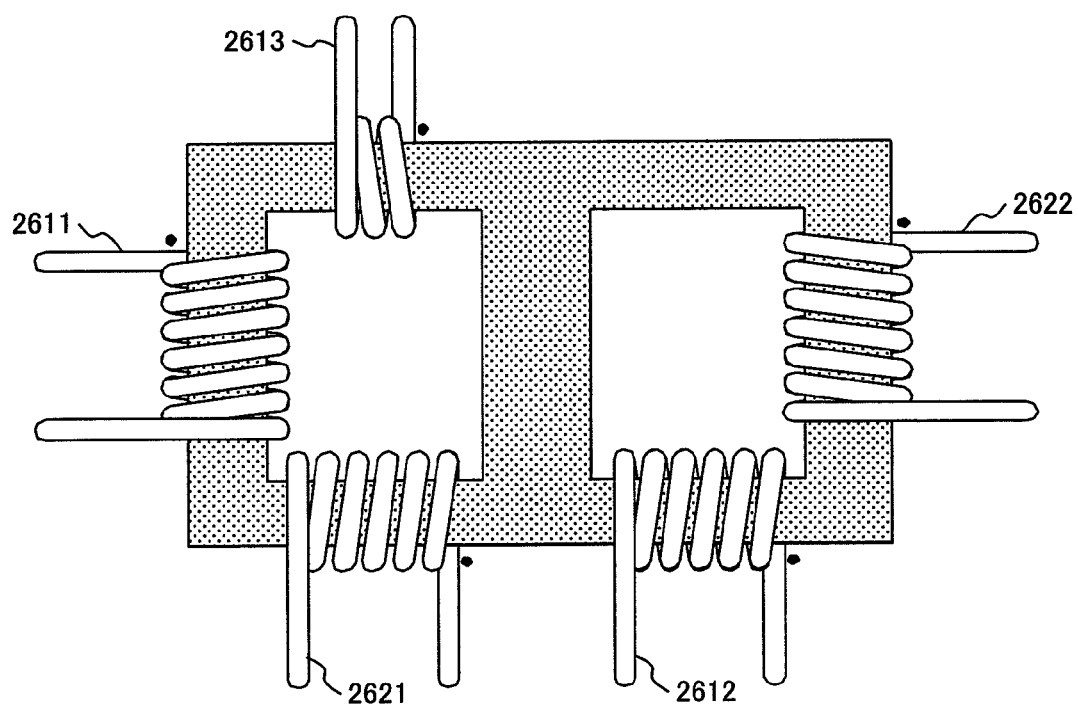
FIG. 26 shows a structural example of another transformer that can be applicable to the embodiments of this invention.

FIG. 26 shows a structural example of another transformer that can be applicable to the embodiments of this invention. This transformer structure is applicable to transformers 1001, 1102, 1301, 1401, and 1601 in Embodiments 8 to 11 and 14 to 17.

In the wiring structure of the transformer, primary, secondary, and tertiary windings (2611, 2612, and 2613) of the first flyback transformer and primary and secondary windings (2621 and 2622) of the second flyback transformer are wound around single EI core 2600. Primary winding 2611 of the first flyback transformer corresponds to transformer 1101a. Secondary winding 2612 corresponds to transformer 1101b. Primary winding 2621 of the second flyback transformer corresponds to the primary winding of transformer 1102. Secondary winding 2622 corresponds to the secondary winding of transformer 1102.

This structure can downsize the inductors since multiple windings can be wound around a single core.

Although the wiring structure of transformer 1101 is described here, this wiring structure is applicable to flyback transformer (1001 and 1102) and forward transformers (1301 and 1401).

Figure 27:
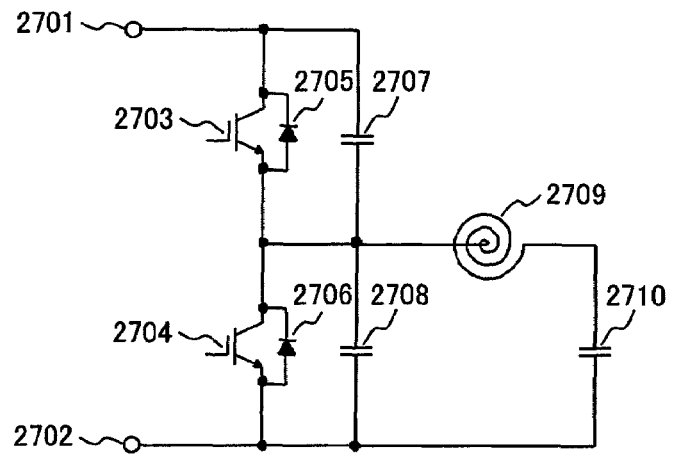
FIG. 27 shows a circuit diagram of a load example to which power can be supplied from the unidirectional DC-DC converter of this invention.

FIG. 27 shows a circuit diagram of a load example to which power can be supplied from the unidirectional DC-DC converter of this invention. This example shows an inverter circuit of an induction heating unit.

A series circuit of main IGBT2703 and auxiliary IGBT2704 is connected between output terminals of converter 2701 and 2702. Diodes 2705 and 2706 are back-to-back connected respectively to main and auxiliary IGBTs. Snubber capacitors 2707 and 2708 are respectively connected in parallel to main and auxiliary IGBTs. A series circuit of heating coil 2709 and resonance capacitor 2710 is connected in parallel to auxiliary IGBT2704.

Figure 28:
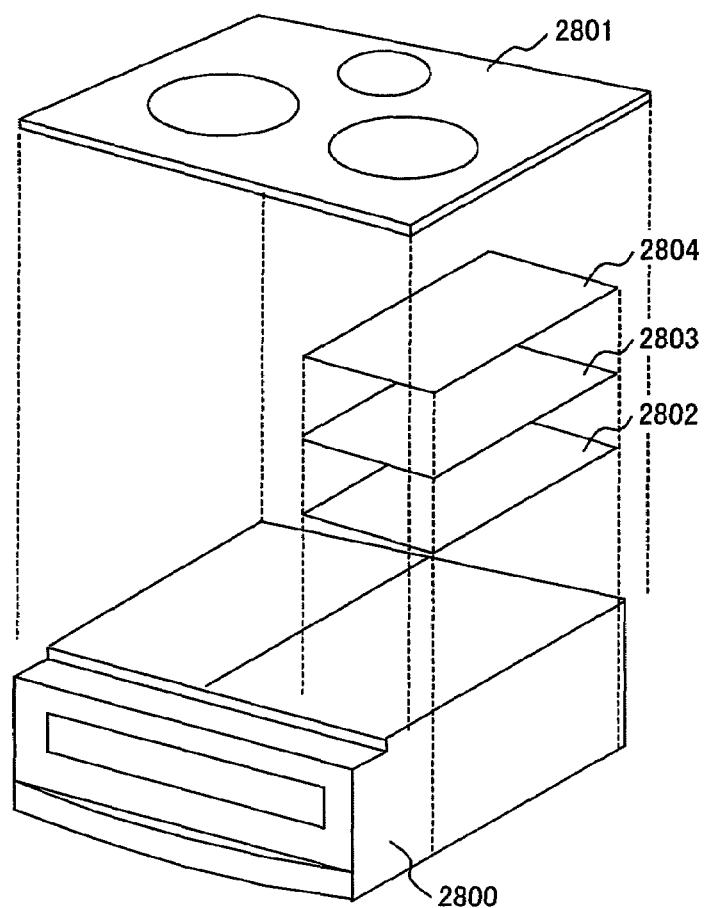
FIG. 28 shows a structural example of an induction heating unit to which the unidirectional DC-DC converter of this invention can be applied.

FIG. 28 shows a structural example of an induction heating unit to which the unidirectional DC-DC converter of this invention can be applied.

The induction heating unit consists of chassis 2800, top plate 2801 on the chassis, inverter/converter board 2802 and resonance capacitor board 2803 in the chassis, and another inverter/converter board 2804 over the above boards.

Embodiment 18

Figure 29:
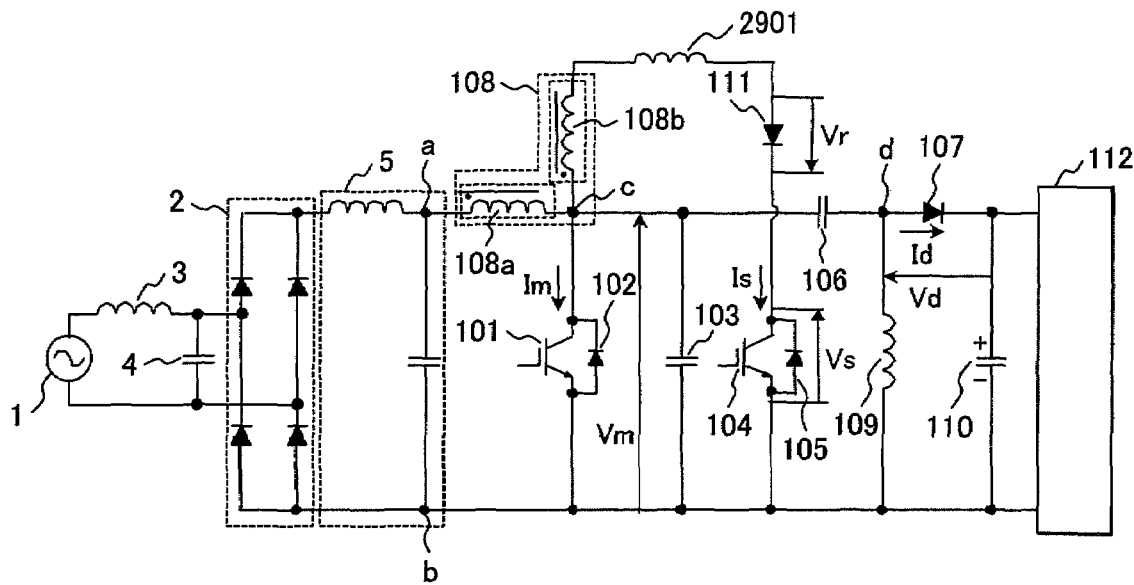
FIG. 29 shows the schematic diagram of the main circuit of the unidirectional DC-DC converter which is the eighteenth embodiment of this invention.

FIG. 29 shows the schematic diagram of the main circuit of the unidirectional DC-DC converter which is the eighteenth embodiment of this invention. This embodiment is also a buck-boost soft-switching type unidirectional DC-DC converter. Since elements of FIG. 29 are identical to those of FIG. 1, like elements are given like reference characters.

Unlike the first embodiment, the eighteenth embodiment connects a series circuit of diode 111 and auxiliary IGBT104 to auxiliary inductor 108b via added inductor 2901.

The operation of the eighteenth embodiment of this invention is the same as that of the first embodiment. This embodiment is characterized in that the inductance value of added inductor 2901 can be set independently of the inductance value of auxiliary inductor 108b. As for the first embodiment, it is necessary to increase the turn ratio of inductor 108 to increase the inductance value of auxiliary IGBT108b. However, if the turn ratio is increased, the withstand voltage of IGBT104 must be increased. This embodiment can freely control the change rate (di/dt) of current Is without increasing the withstand voltage of auxiliary IGBT104 by adding inductor 2901 of any inductance value independently of the turn ratio of inductor 108 and consequently enables noise-less stable operation.

Embodiment 19

Figure 30:
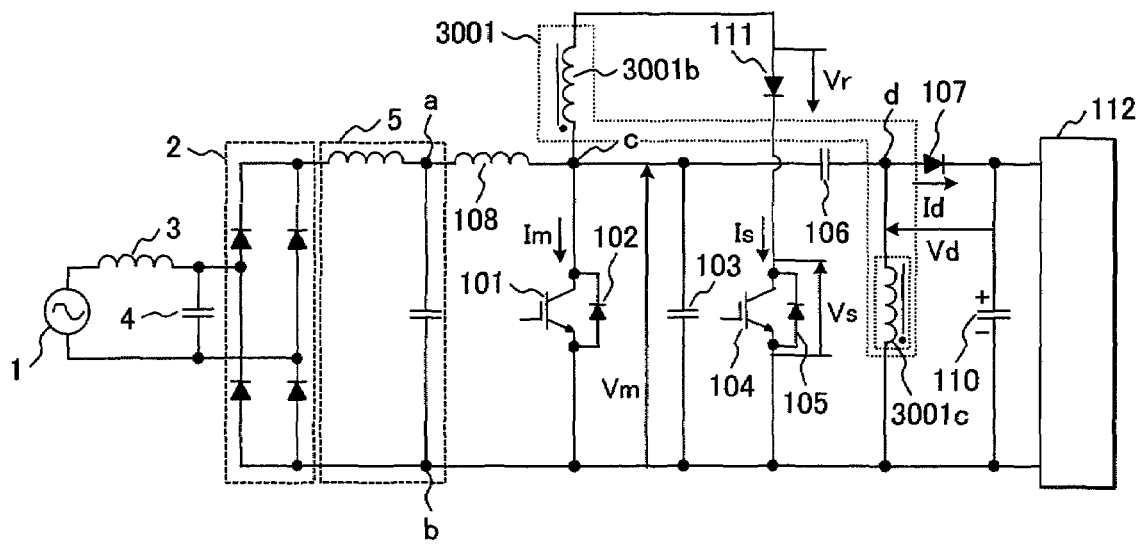
FIG. 30 shows the schematic diagram of the main circuit of the unidirectional DC-DC converter which is the nineteenth embodiment of this invention.

FIG. 30 shows the schematic diagram of the main circuit of the unidirectional DC-DC converter which is the nineteenth embodiment of this invention. Since elements of FIG. 30 are identical to those of FIG. 1, like elements are given like reference characters.

Unlike the first embodiment, the nineteenth embodiment provides coupled inductor 3001 independently of main inductor 108 and uses it as auxiliary inductor 3001b and third inductor 3001c.

The operation and effect of the nineteenth embodiment can be described similarly to the first embodiment.

Embodiment 20

Figure 31:
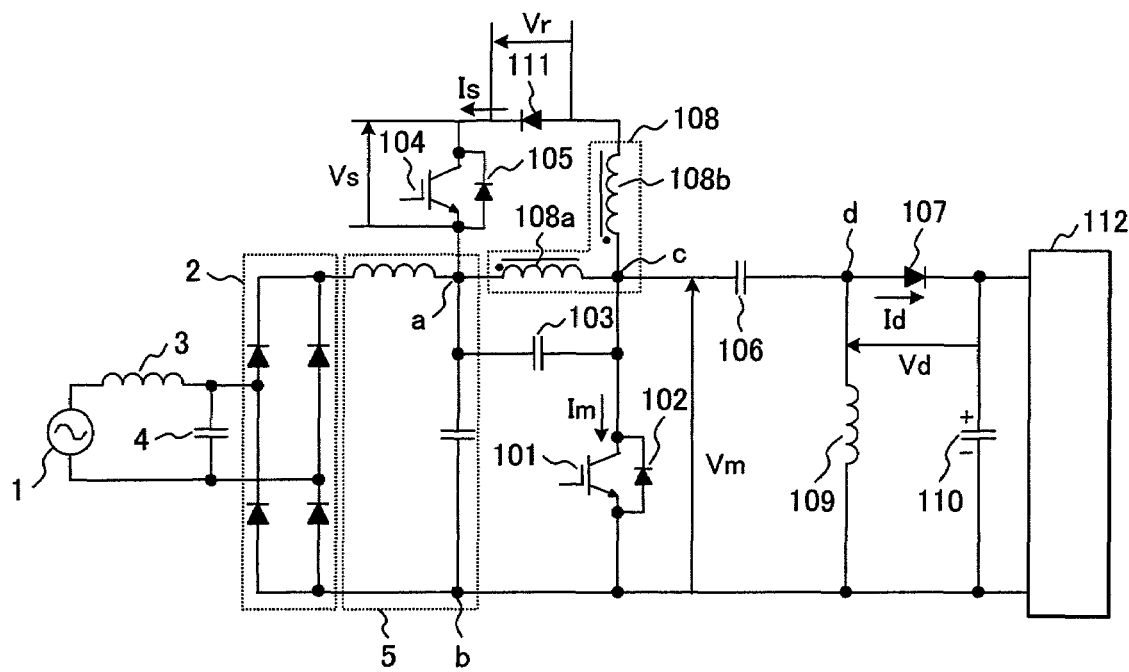
FIG. 31 shows the schematic diagram of the main circuit of the unidirectional DC-DC converter which is the twentieth embodiment of this invention.

FIG. 31 shows the schematic diagram of the main circuit of the unidirectional DC-DC converter which is the twentieth embodiment of this invention. Since elements of FIG. 31 are identical to those of FIG. 1, like elements are given like reference characters.

Unlike the first embodiment, the twentieth embodiment connects snubber capacitor 103 across inductor 108a and the emitter terminal of auxiliary switching element IGBT104 to point "a".

The operation and effect of the twentieth embodiment can be described similarly to the first embodiment. This embodiment can reduce collector-emitter voltage Vs of auxiliary IGBT104. Voltage Vs applied between the collector and the emitter of auxiliary IGBT104 is the sum of a voltage output from the converter and a voltage generated according to the turn ratio of the auxiliary inductor. Therefore, this embodiment can reduce the withstand voltage of auxiliary IGBT104 and accomplish a low-loss converter.

Figure 32:
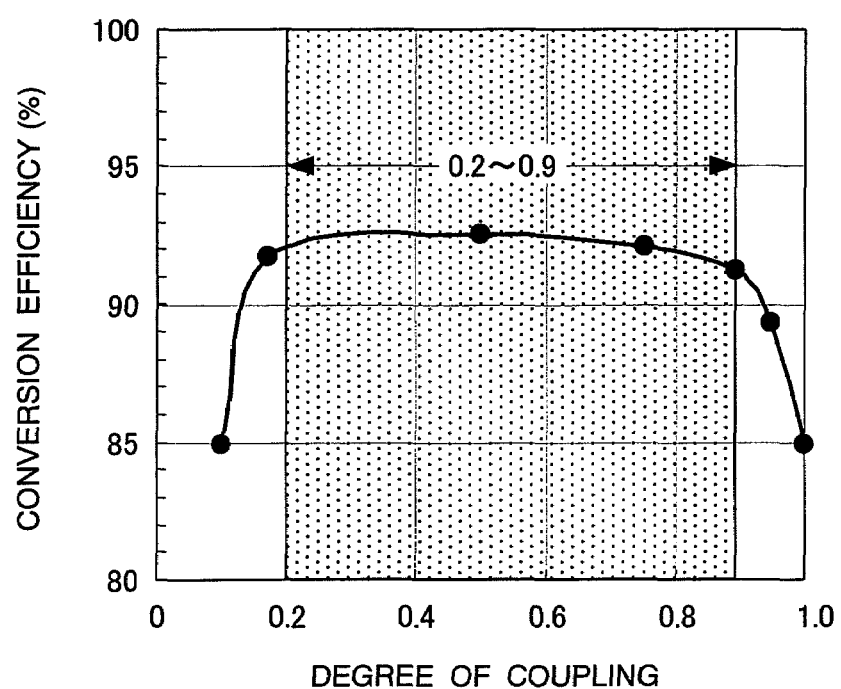
FIG. 32 shows a graph which indicates the relationship of the degree of coupling of the coupled inductor in the unidirectional DC-DC converter and the conversion efficiency of the unidirectional DC-DC converter.

FIG. 32 shows a graph which indicates the relationship of the degree of coupling of the coupled inductor in the unidirectional DC-DC converter and the conversion efficiency of the unidirectional DC-DC converter. As shown in FIG. 32 as the result of experiments, it is possible to increase the conversion efficiency to 90% or more by selecting 0.2 to 0.9 as the degree of coupling of the coupled inductor. The mechanism is as follows: When the degree of coupling of the coupled inductor becomes low (loose coupling), the leakage inductance in the secondary side becomes greater. The leakage inductance L1 is expressed by Formula (1).

$$L1 = L \times (1-k) \quad (1)$$

where

"L" is a secondary inductance value and "k" is the degree of coupling.

"k" is expressed by Formula (2).

$$k = \sqrt{(L-L')/L} \quad (2)$$

where

"L" is a secondary inductance value when the primary side is short-circuited.

In the above formula, when "k" (degree of coupling) is made smaller, the leakage inductance increases and the change rate (dIi/dTi) of current Is in the secondary side becomes smaller. Consequently, overlapping between current Is and voltage Vs becomes smaller on the graph and losses can be reduced.

Figure 33:
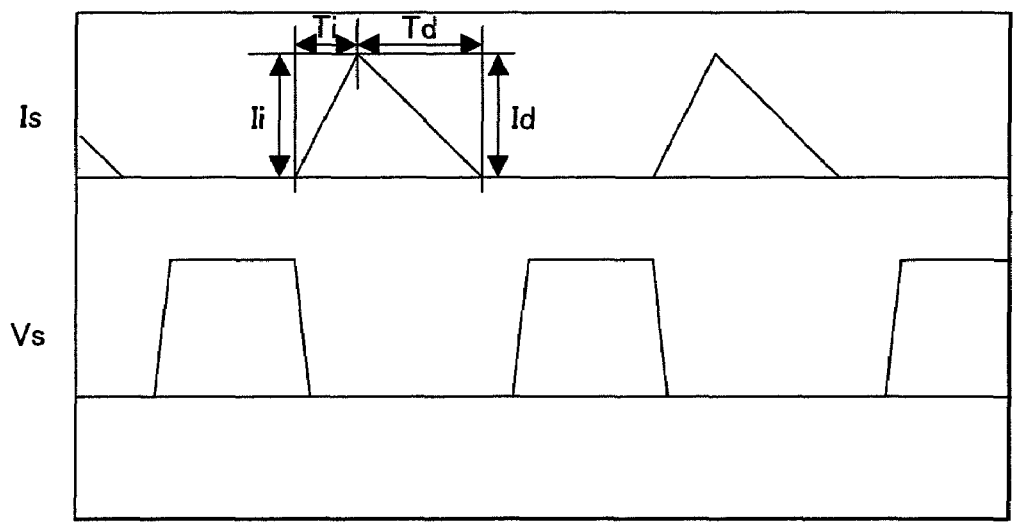
FIG. 33 shows a graph representing a relationship of the degree of coupling of the coupled inductor, operating current, and voltage waveform in the unidirectional DC-DC converter of this invention.
Figure 33:
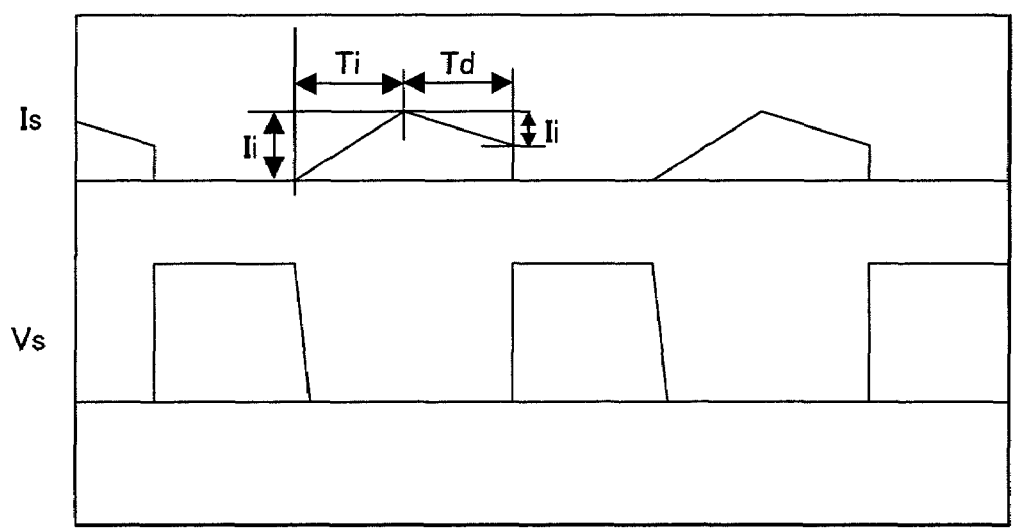

FIG. 33 shows a graph representing a relationship of the degree of coupling of the coupled inductor, operating current, and voltage waveform in the unidirectional DC-DC converter of this invention. FIG. 33(A) shows the graph in case of "k"=0.2 to 0.9 and FIG. 33(B) shows the graph in case of "k"<0.2.

When the degree of coupling "k" is 0.2 to 0.9, the gradient (dIi/dTi) of current Is in the secondary side becomes smaller. Consequently, overlapping between current Is and voltage Vs becomes smaller on the graph and losses can be reduced.

When the degree of coupling "k" is less than 0.2, the current and voltage waveforms are those shown in FIG. 33(B) and the leak inductance value becomes too great. Consequently, current Is drops and the change rate dId/dTd becomes too small. This causes hard switching.

As described above, it is possible to assure the conversion efficiency of 90% by setting 0.2 to 0.9 as the degree of coupling of the coupled inductor.

The above embodiments mainly handle examples using IGBTs as switching elements. However, the unidirectional DC-DC converter of this invention can adopt not only IGBTs but also power MOSFETs, other insulated gate semiconductor devices, and bipolar transistors. It is apparent to those skilled in the art that similar effects can be obtained by these devices.

What is claimed is:

1. A unidirectional DC-DC converter comprising a first switching element which supplies and shuts off current from a DC power supply to a first inductor, a diode which is back-to-back connected to the first switching element, a snubber capacitor which is connected in parallel to the first switching element, a control gate which turns on and off the first switching element and controls the duty of the first switching element, a circuit means which applies current to the back-to-back-connected diode in a short period including a time period in which the first switching element is turned on, and a diode which discharges energy stored in the inductor to the output side, wherein the circuit means is equipped with a series connection which is comprised of a second switching element and a second inductor and connected across the first switching element, and the second inductor being magnetically coupled with the first inductor, wherein the second switching element is turned on just before the first switching element is turned on, and further comprising a smoothing circuit which smoothes a voltage across the first switching element and takes out an output voltage without a transformer, wherein the smoothing circuit is equipped with a series circuit comprised of a first capacitor and a third inductor which is connected across the first switching element and a series circuit comprised of a diode and a second capacitor which is connected across the third inductor, and a load is connected across the second capacitor.

2. The unidirectional DC-DC converter of claim 1, wherein the third inductor in the smoothing circuit is magnetically coupled with the first and second inductors.

3. A unidirectional DC-DC converter comprising a first switching element which supplies and shuts off current from a DC power supply to a first inductor, a diode which is back-to-back connected to the first switching element, a snubber capacitor which is connected in parallel to the first switching element, a control gate which turns on and off the first switching element and controls the duty of the first switching element, a circuit means which applies current to the back-to-back-connected diode in a short period including a time period in which the first switching element is turned on, and a diode which discharges energy stored in the inductor to the output side, wherein the circuit means is equipped with a series connection which is comprised of a second switching element and a second inductor and connected across the first switching element, and the second inductor being magnetically coupled with the first inductor, wherein the second switching element is turned on just before the first switching element is turned on, and further comprising a smoothing circuit which smoothes a voltage across the first switching element and takes out an output voltage without a transformer, wherein the smoothing circuit is equipped with a series circuit comprised of a first capacitor and a diode which is connected across the first switching element and a series circuit comprised of a third inductor and a second capacitor which is connected across the diode, and a load is connected across the second capacitor.

* * * * *